United States Patent
Tseng

(10) Patent No.: US 9,769,699 B2
(45) Date of Patent: Sep. 19, 2017

(54) METHOD AND APPARATUS FOR PERFORMING DEVICE TO DEVICE (D2D) CONTENT ESTIMATION AND TRIGGERING OF BUFFER STATUS REPORTING (BSR) IN A WIRELESS COMMUNICATION SYSTEM

(71) Applicant: INNOVATIVE SONIC CORPORATION, Taipei (TW)

(72) Inventor: Li-Chih Tseng, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 75 days.

(21) Appl. No.: 14/855,837

(22) Filed: Sep. 16, 2015

(65) Prior Publication Data

US 2016/0080969 A1    Mar. 17, 2016

Related U.S. Application Data

(60) Provisional application No. 62/051,521, filed on Sep. 17, 2014.

(51) Int. Cl.
| | |
|---|---|
| *H04W 28/02* | (2009.01) |
| *H04L 12/26* | (2006.01) |
| *H04W 4/00* | (2009.01) |
| *H04W 76/04* | (2009.01) |
| *H04W 72/00* | (2009.01) |
| *H04W 92/18* | (2009.01) |

(52) U.S. Cl.
CPC ......... *H04W 28/0278* (2013.01); *H04L 43/08* (2013.01); *H04W 4/005* (2013.01); *H04W 76/043* (2013.01); *H04W 72/00* (2013.01); *H04W 92/18* (2013.01)

(58) Field of Classification Search
None
See application file for complete search history.

(56) References Cited

U.S. PATENT DOCUMENTS

| | | | | |
|---|---|---|---|---|
| 2014/0003319 A1* | 1/2014 | Etemad | ................ | H04W 28/08 370/312 |
| 2014/0226484 A1* | 8/2014 | Koskela | ............ | H04W 72/1284 370/235 |
| 2015/0055567 A1* | 2/2015 | Narasimha | .......... | H04W 76/023 370/329 |
| 2015/0071212 A1* | 3/2015 | Kim | .................... | H04W 72/042 370/329 |
| 2015/0282234 A1* | 10/2015 | Sartori | ................ | H04W 76/023 370/329 |
| 2016/0014794 A1* | 1/2016 | Wu | ....................... | H04W 72/10 370/329 |
| 2016/0044653 A1* | 2/2016 | Bagheri | ............ | H04W 72/0413 370/329 |

(Continued)

*Primary Examiner* — Min Jung
(74) *Attorney, Agent, or Firm* — Blue Capital Law Firm, P.C.

(57) ABSTRACT

A method and apparatus are disclosed for performing buffer status reporting in a wireless communication system. The method includes a D2D (Device-to-Device) data arriving in the UE. The method also includes triggering a ProSe (Proximity-based Service) BSR (Buffer Status Report). The method further includes deriving a buffer size value by at least considering an amount of oncoming data. In addition, the method includes sending the ProSe BSR.

8 Claims, 22 Drawing Sheets

(56) References Cited

U.S. PATENT DOCUMENTS

2016/0044707 A1\* 2/2016 Folke ................ H04W 72/1284
370/329
2016/0302252 A1\* 10/2016 Wang ........................ H04L 1/00
2016/0374110 A1\* 12/2016 Lee ................... H04W 28/0278

\* cited by examiner

R/R/E/LCID sub-header

METHOD AND APPARATUS FOR PERFORMING DEVICE TO DEVICE (D2D) CONTENT ESTIMATION AND TRIGGERING OF BUFFER STATUS REPORTING (BSR) IN A WIRELESS COMMUNICATION SYSTEM

CROSS-REFERENCE TO RELATED APPLICATIONS

The present application claims the benefit of U.S. Provisional Patent Application Ser. No. 62/051,521 filed on Sep. 17, 2014, the entire disclosure of which is incorporated herein by reference.

FIELD

This disclosure generally relates to wireless communication networks, and more particularly, to a method and apparatus for performing D2D content estimation and triggering of BSR in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed for performing buffer status reporting in a wireless communication system. The method includes a D2D (Device-to-Device) data arriving in the UE. The method also includes triggering a ProSe (Proximity-based Service) BSR (Buffer Status Report) and utilization of D2D grant. The method further includes deriving a buffer size value by at least considering an amount of oncoming data. In addition, the method includes sending the ProSe BSR. In general, the method includes triggering and reporting ProSe BSR, and possibly using the later received D2D grant by overwriting a previously received D2D grant for a specific period occurring after the reception of the D2D grants so that the network could have a better understanding of buffer status in the UE side and/or the UE could have a flexible way to trigger BSR and use D2D grant(s) for sending buffered data.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including SP-110638, "WID on Proposal for a study on Proximity-based Services"; R2-141256, "Layer 2 procedures for D2D Communication", Ericsson; R2-140625, "Resource allocation for D2D transmitters in coverage", Ericsson; TS 36.321 V11.2.0, "Medium Access Control (MAC) protocol specification"; R1-143590, "Chairman's Notes of Agenda Item 7.2.3 LTE Device to Device Proximity Services", Session Chairman (Alcatel-Lucent). The standards and documents listed above are hereby expressly incorporated by reference in their entirety.

Figure 1:
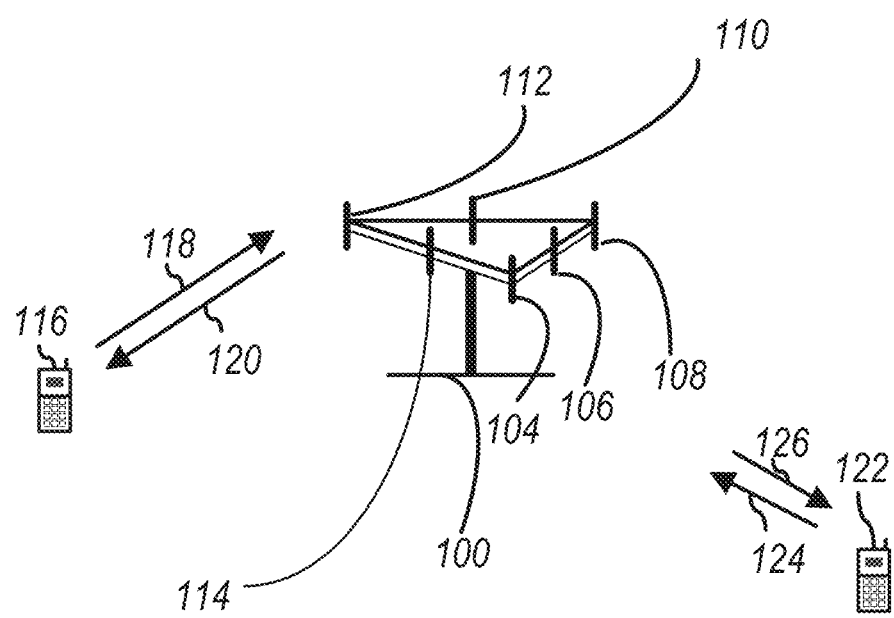
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
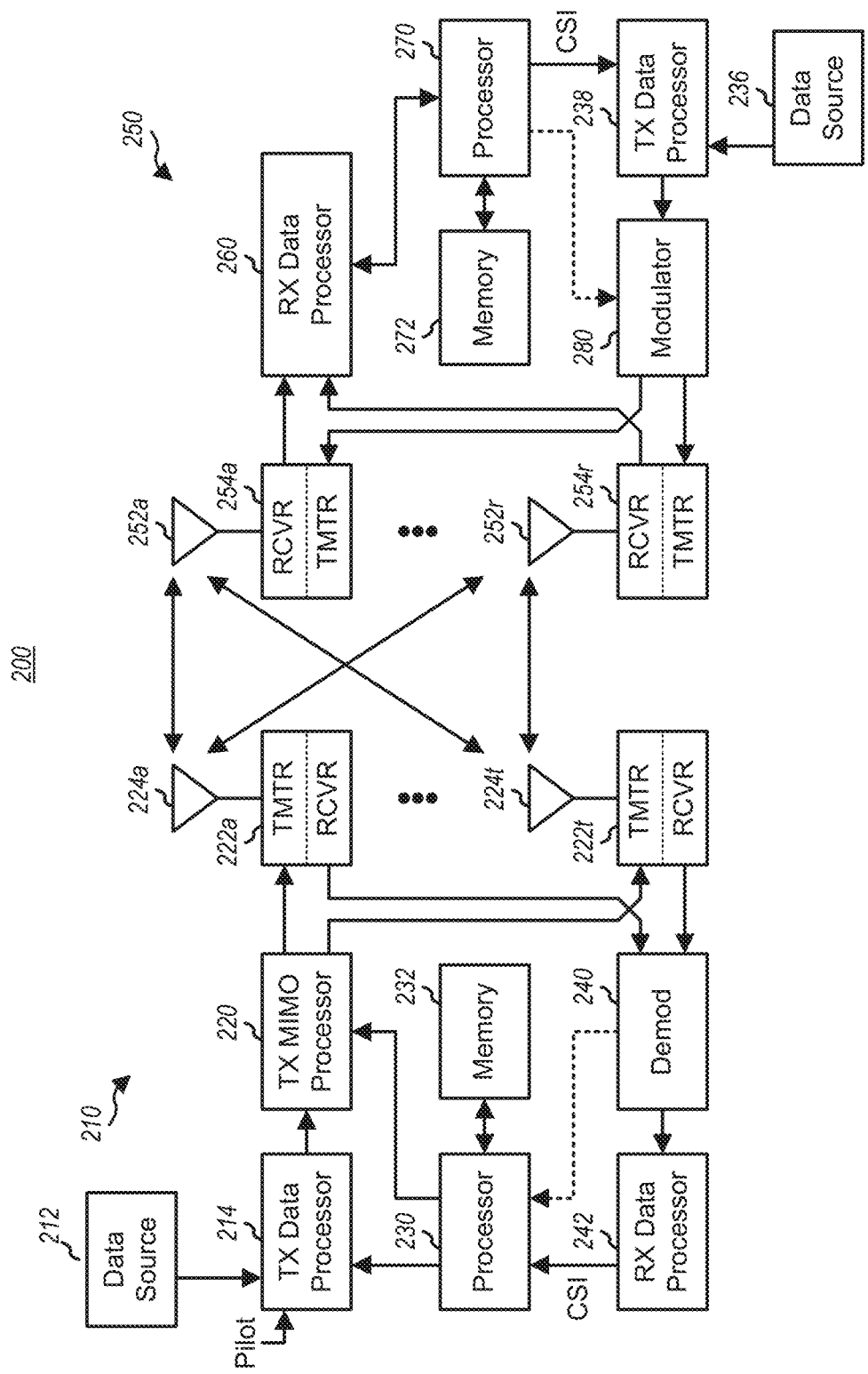
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
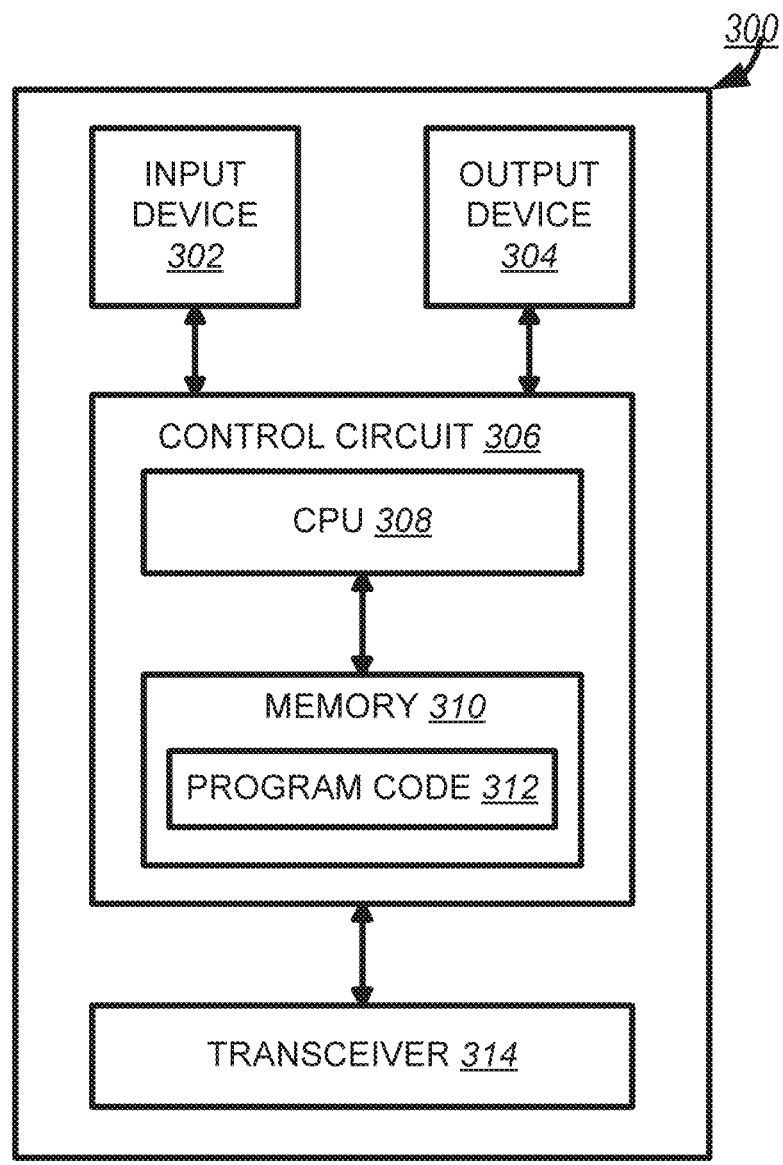
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
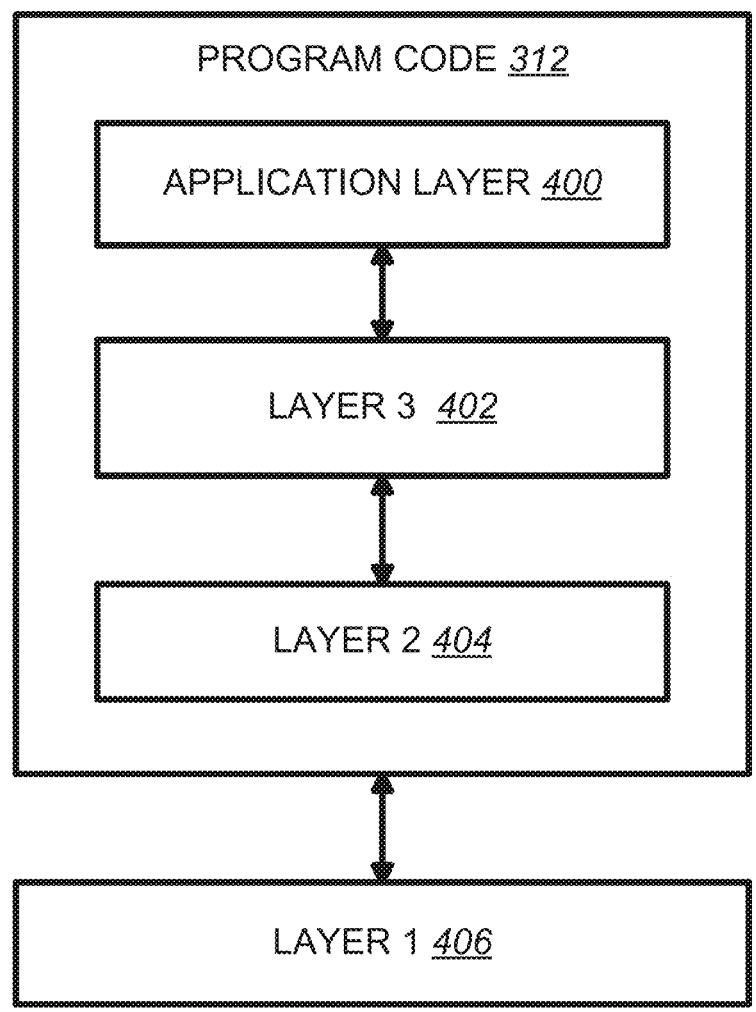
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP SP-110638 proposes a new study item on proximity-based services (ProSe), i.e. D2D services. 3GPP SP-110638 describes the justification and objective of this study item as follows:

3 Justification

Proximity-based applications and services represent a recent and enormous socio-technological trend. The principle of these applications is to discover instances of the applications running in devices that are within proximity of each other, and ultimately also exchange application-related data. In parallel, there is interest in proximity-based discovery and communications in the public safety community.

Current 3GPP specification are only partially suited for such needs, since all such traffic and signalling would have to be routed in the network, thus impacting their performance and adding un-necessary load in the network. These current limitations are also an obstacle to the creation of even more advanced proximity-based applications.

In this context, 3GPP technology, has the opportunity to become the platform of choice to enable proximity-based discovery and communication between devices, and promote a vast array of future and more advanced proximity-based applications.

4 Objective

The objective is to study use cases and identify potential requirements for an operator network controlled discovery and communications between devices that are in proximity, under continuous network control, and are under a 3GPP network coverage, for:
1. Commercial/social use
2. Network offloading
3. Public Safety
4. Integration of current infrastructure services, to assure the consistency of the user experience including reachability and mobility aspects Additionally, the study item will study use cases and identify potential requirements for
5. Public Safety, in case of absence of EUTRAN coverage (subject to regional regulation and operator policy, and limited to specific public-safety designated frequency bands and terminals)

Use cases and service requirements will be studied including network operator control, authentication, authorization, accounting and regulatory aspects.

The study does not apply to GERAN or UTRAN.

The RAN2#85 meeting chairman notes agreed that UE can request D2D resource from network via Random Access (RA) procedure as follows:

2 In Mode 1, a UE requests transmission resources from an eNB. The eNB schedules transmission resources for transmission of scheduling assignment(s) and data.

2a In Mode 1, the UE sends a scheduling request (D-SR or RA) to the eNB followed by a BSR based on which the eNB can determine that the UE intends to perform a D2D transmission as well as the required amount resources.

3GPP R2-141256 introduced a D2D resource request/grant procedure using random access (RA) procedure and a new MAC control element, called D2D BSR, as follows:

2.1 Request/Grant Procedure

This procedure applies only to communication mode 1. When initiating this procedure, the UE has been configured with a logical channel for D2D Communication. It is also assumed that the UE is in RRC_CONNECTED. The purpose of this procedure is for the UE to get a grant from the eNB to transmit on the ProSe physical channel. There are two cases, whether the UE has a PUCCH resource to send the Scheduling Request on or not.

[ ... ]

2.1.2 the UE does not have a PUCCH Resource

In this case the UE needs to perform a random access procedure. We think that the current random access procedure can be reused. FIG. 1 shows how the random access procedure is used to support D2D Communication requests and grants.

Figure 5:
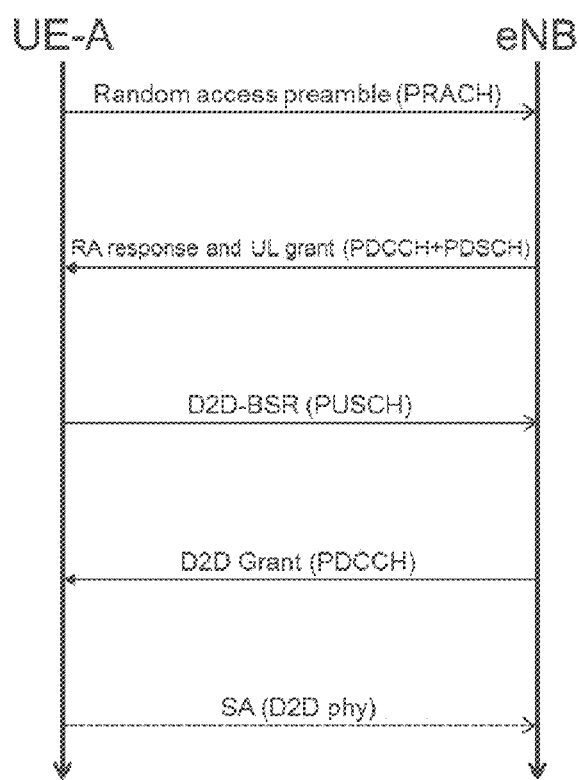
FIG. 5 is a reproduction of FIG. 2 of 3GPP R2-141256.

[FIG. 2 of 3GPP R2-141256 has been reproduced as FIG. 5]

[ ... ]

2.1.3 The D2D-BSR

The D2D-BSR should be transmitted on the PUSCH similar to legacy BSR. The purpose of the D2D-BSR is for the UE to inform the eNB about the amount of data the UE has on logical channels related to D2D. As mentioned earlier, the eNB configures the UE with a logical channel ID to be used for D2D communication. Although this makes it possible to reuse the existing BSR, it would require at least one logical channel group for D2D communication. If the UE is also configured with legacy LTE bearers and D2D discovery, the four existing logical channel groups may become a restriction.

We think it is better to introduce a new MAC CE, called ProSe BSR, which would be used to indicate the buffer status of D2D services. The exact details of this new BSR are FFS.

Proposal 3 Introduce a new MAC CE (ProSe BSR) which the UE uses to indicate the buffer status of D2D services.

3GPP R2-140625 proposed a mechanism, which is similar with legacy mechanism, for transmitting D2D BSR as follows:

2.1.1.4 Proposed Request/Grant Procedure for D2D

Based on the above discussion and the identified problems in observation 3, we propose the following request/grant procedure for D2D:

Step 1.1 UE sends SR (Scheduling Request) to eNB via PUCCH;

Step 1.2 eNB grants UL resource (for UE to send BSR) via PDCCH, scrambled by C-RNTI;

Step 1.3 UE sends D2D BSR indicating the buffer status via PUSCH;

Step 1.4 eNB grants D2D resource (for UE to send data) via PDCCH, scrambled by D2D-RNTI.

Upon completion of this procedure the UE will have a D2D resource to transmit the data on.

Proposal 1 Before performing a D2D transmission in coverage, the UE shall get a grant from the network.

3GPP TS36.321 v11.2.0 introduced how a BSR triggers a SR or D-SR procedure or a Random Access procedure for transmission and legacy BSR format as follows:

5 MAC Procedures
5.1 Random Access Procedure
[ . . . ]
5.1.3 Random Access Preamble Transmission
The random-access procedure shall be performed as follows:
   set PREAMBLE_RECEIVED_TARGET_POWER to preambleInitialReceivedTargetPower+DELTA_PREAMBLE+(PREAMBLE_TRANSMISSION_COUNTER−1)*powerRampingStep;
   instruct the physical layer to transmit a preamble using the selected PRACH, corresponding RA-RNTI, preamble index and PREAMBLE_RECEIVED_TARGET_POWER.

5.1.4 Random Access Response Reception
Once the Random Access Preamble is transmitted and regardless of the possible occurrence of a measurement gap, the UE shall monitor the PDCCH of the PCell for Random Access Response(s) identified by the RA-RNTI defined below, in the RA Response window which starts at the subframe that contains the end of the preamble transmission [7] plus three subframes and has length ra-ResponseWindowSize subframes. The RA-RNTI associated with the PRACH in which the Random Access Preamble is transmitted, is computed as:

$$RA\text{-}RNTI = 1 + t\_id + 10 * f\_id$$

Where t_id is the index of the first subframe of the specified PRACH ($0 \leq t\_id < 10$), and f_id is the index of the specified PRACH within that subframe, in ascending order of frequency domain ($0 \leq f\_id < 6$). The UE may stop monitoring for Random Access Response(s) after successful reception of a Random Access Response containing Random Access Preamble identifiers that matches the transmitted Random Access Preamble.
   If a downlink assignment for this TTI has been received on the PDCCH for the RA-RNTI and the received TB is successfully decoded, the UE shall regardless of the possible occurrence of a measurement gap:
   if the Random Access Response contains a Backoff Indicator subheader:
     set the backoff parameter value in the UE as indicated by the BI field of the Backoff Indicator subheader and Table 7.2-1.
   else, set the backoff parameter value in the UE to 0 ms.
   if the Random Access Response contains a Random Access Preamble identifier corresponding to the transmitted Random Access Preamble (see subclause 5.1.3), the UE shall:
     consider this Random Access Response reception successful and apply the following actions for the serving cell where the Random Access Preamble was transmitted:
       process the received Timing Advance Command (see subclause 5.2);
       indicate the preambleInitialReceivedTargetPower and the amount of power ramping applied to the latest preamble transmission to lower layers (i.e., (PREAMBLE_TRANSMISSION_COUNTER−1)*powerRampingStep);
       process the received UL grant value and indicate it to the lower layers;
     if ra-PreambleIndex was explicitly signalled and it was not 000000 (i.e., not selected by MAC):
       consider the Random Access procedure successfully completed.
     else, if the Random Access Preamble was selected by UE MAC:
       set the Temporary C-RNTI to the value received in the Random Access Response message no later than at the time of the first transmission corresponding to the UL grant provided in the Random Access Response message;
       if this is the first successfully received Random Access Response within this Random Access procedure:
         if the transmission is not being made for the CCCH logical channel, indicate to the Multiplexing and assembly entity to include a C-RNTI MAC control element in the subsequent uplink transmission;
         obtain the MAC PDU to transmit from the "Multiplexing and assembly" entity and store it in the Msg3 buffer.
   NOTE: When an uplink transmission is required, e.g., for contention resolution, the eNB should not provide a grant smaller than 56 bits in the Random Access Response.
   NOTE: If within a Random Access procedure, an uplink grant provided in the Random Access Response for the same group of Random Access Preambles has a different size than the first uplink grant allocated during that Random Access procedure, the UE behavior is not defined.

If no Random Access Response is received within the RA Response window, or if none of all received Random Access Responses contains a Random Access Preamble identifier corresponding to the transmitted Random Access Preamble, the Random Access Response reception is considered not successful and the UE shall:
   increment PREAMBLE_TRANSMISSION_COUNTER by 1;
   If PREAMBLE_TRANSMISSION_COUNTER=preambleTransMax+1:
     if the Random Access Preamble is transmitted on the PCell:
       indicate a Random Access problem to upper layers;
     if the Random Access Preamble is transmitted on an SCell:
       consider the Random Access procedure unsuccessfully completed.
   if in this Random Access procedure, the Random Access Preamble was selected by MAC:
     based on the backoff parameter in the UE, select a random backoff time according to a uniform distribution between 0 and the Backoff Parameter Value;
     delay the subsequent Random Access transmission by the backoff time;
   proceed to the selection of a Random Access Resource (see subclause 5.1.2).

5.1.5 Contention Resolution
Contention Resolution is based on either C-RNTI on PDCCH of the PCell or UE Contention Resolution Identity on DL-SCH.
   Once Msg3 is transmitted, the UE shall:
   start mac-ContentionResolutionTimer and restart mac-ContentionResolutionTimer at each HARQ retransmission;
   regardless of the possible occurrence of a measurement gap, monitor the PDCCH until mac-ContentionResolutionTimer expires or is stopped;

if notification of a reception of a PDCCH transmission is received from lower layers, the UE shall:
  if the C-RNTI MAC control element was included in Msg3:
    if the Random Access procedure was initiated by the MAC sublayer itself and the PDCCH transmission is addressed to the C-RNTI and contains an UL grant for a new transmission; or
    if the Random Access procedure was initiated by a PDCCH order and the PDCCH transmission is addressed to the C-RNTI:
      consider this Contention Resolution successful;
      stop mac-ContentionResolutionTimer;
      discard the Temporary C-RNTI;
      consider this Random Access procedure successfully completed.
  else if the CCCH SDU was included in Msg3 and the PDCCH transmission is addressed to its Temporary C-RNTI:
    if the MAC PDU is successfully decoded:
      stop mac-ContentionResolutionTimer;
      if the MAC PDU contains a UE Contention Resolution Identity MAC control element; and
      if the UE Contention Resolution Identity included in the MAC control element matches the CCCH SDU transmitted in Msg3:
        consider this Contention Resolution successful and finish the disassembly and demultiplexing of the MAC PDU;
        set the C-RNTI to the value of the Temporary C-RNTI;
        discard the Temporary C-RNTI;
        consider this Random Access procedure successfully completed.
      else
        discard the Temporary C-RNTI;
        consider this Contention Resolution not successful and discard the successfully decoded MAC PDU.
if mac-ContentionResolutionTimer expires:
  discard the Temporary C-RNTI;
  consider the Contention Resolution not successful.
if the Contention Resolution is considered not successful the UE shall:
  flush the HARQ buffer used for transmission of the MAC PDU in the Msg3 buffer;
  increment PREAMBLE_TRANSMISSION_COUNTER by 1;
  If PREAMBLE_TRANSMISSION_COUNTER=preambleTransMax+1:
    indicate a Random Access problem to upper layers.
  based on the backoff parameter in the UE, select a random backoff time according to a uniform distribution between 0 and the Backoff Parameter Value;
  delay the subsequent Random Access transmission by the backoff time;
  proceed to the selection of a Random Access Resource (see subclause 5.1.2).
[ . . . ]

5.4.4 Scheduling Request

The Scheduling Request (SR) is used for requesting UL-SCH resources for new transmission. When an SR is triggered, it shall be considered as pending until it is cancelled. All pending SR(s) shall be cancelled and sr-ProhibitTimer shall be stopped when a MAC PDU is assembled and this PDU includes a BSR which contains buffer status up to (and including) the last event that triggered a BSR (see subclause 5.4.5), or when the UL grant(s) can accommodate all pending data available for transmission.

If an SR is triggered and there is no other SR pending, the UE shall set the SR_COUNTER to 0. As long as one SR is pending, the UE shall for each TTI:
  if no UL-SCH resources are available for a transmission in this TTI:
    if the UE has no valid PUCCH resource for SR configured in any TTI: initiate a Random Access procedure (see subclause 5.1) on the PCell and cancel all pending SRs;
    else if the UE has a valid PUCCH resource for SR configured for this TTI and if this TTI is not part of a measurement gap and if sr-ProhibitTimer is not running:
      if SR_COUNTER<dsr-TransMax:
        increment SR_COUNTER by 1;
        instruct the physical layer to signal the SR on PUCCH;
        start the sr-ProhibitTimer.
      else:
        notify RRC to release PUCCH/SRS for all serving cells;
        clear any configured downlink assignments and uplink grants;
        initiate a Random Access procedure (see subclause 5.1) on the PCell and cancel all pending SRs.

5.4.5 Buffer Status Reporting

The Buffer Status reporting procedure is used to provide the serving eNB with information about the amount of data available for transmission in the UL buffers of the UE. RRC controls BSR reporting by configuring the two timers periodicBSR-Timer and retxBSR-Timer and by, for each logical channel, optionally signalling logicalChannelGroup which allocates the logical channel to an LCG [8].

For the Buffer Status reporting procedure, the UE shall consider all radio bearers which are not suspended and may consider radio bearers which are suspended.

A Buffer Status Report (BSR) shall be triggered if any of the following events occur:
  UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";
  UL resources are allocated and number of padding bits is equal to or larger than the size of the Buffer Status Report MAC control element plus its subheader, in which case the BSR is referred below to as "Padding BSR";
  retxBSR-Timer expires and the UE has data available for transmission for any of the logical channels which belong to a LCG, in which case the BSR is referred below to as "Regular BSR";
  periodicBSR-Timer expires, in which case the BSR is referred below to as "Periodic BSR".

For Regular and Periodic BSR:
  if more than one LCG has data available for transmission in the TTI where the BSR is transmitted: report Long BSR;
  else report Short BSR.
For Padding BSR:
  if the number of padding bits is equal to or larger than the size of the Short BSR plus its subheader but smaller than the size of the Long BSR plus its subheader:
    if more than one LCG has data available for transmission in the TTI where the BSR is transmitted: report Truncated BSR of the LCG with the highest priority logical channel with data available for transmission;
    else report Short BSR.
  else if the number of padding bits is equal to or larger than the size of the Long BSR plus its subheader, report Long BSR.
If the Buffer Status reporting procedure determines that at least one BSR has been triggered and not cancelled:
  if the UE has UL resources allocated for new transmission for this TTI:
    instruct the Multiplexing and Assembly procedure to generate the BSR MAC control element(s);
    start or restart periodicBSR-Timer except when all the generated BSRs are Truncated BSRs;
    start or restart retxBSR-Timer.
  else if a Regular BSR has been triggered:
    if an uplink grant is not configured or the Regular BSR was not triggered due to data becoming available for transmission for a logical channel for which logical channel SR masking (logicalChannelSR-Mask) is setup by upper layers:
      a Scheduling Request shall be triggered.
A MAC PDU shall contain at most one MAC BSR control element, even when multiple events trigger a BSR by the time a BSR can be transmitted in which case the Regular BSR and the Periodic BSR shall have precedence over the padding BSR.

The UE shall restart retxBSR-Timer upon indication of a grant for transmission of new data on any UL-SCH.

All triggered BSRs shall be cancelled in case the UL grant(s) in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.
  NOTE: A Padding BSR is not allowed to cancel a triggered Regular/Periodic BSR. A Padding BSR is triggered for a specific MAC PDU only and the trigger is cancelled when this MAC PDU has been built.
[ . . . ]
6.1.2 MAC PDU (DL-SCH and UL-SCH Except Transparent MAC and Random Access Response, MCH)

Figure 6:
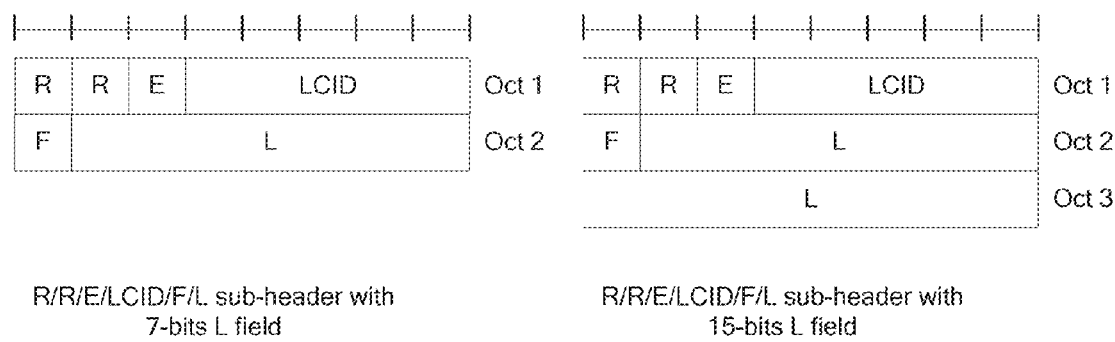
FIG. 6 is a reproduction of FIG. 6.1.2-1 of 3GPP TS36.321 v11.2.0.

A MAC PDU consists of a MAC header, zero or more MAC Service Data Units (MAC SDU), zero, or more MAC control elements, and optionally padding; as described in FIG. 6.1.2-3.

Both the MAC header and the MAC SDUs are of variable sizes.

A MAC PDU header consists of one or more MAC PDU subheaders; each subheader corresponds to either a MAC SDU, a MAC control element or padding.

Figure 7:
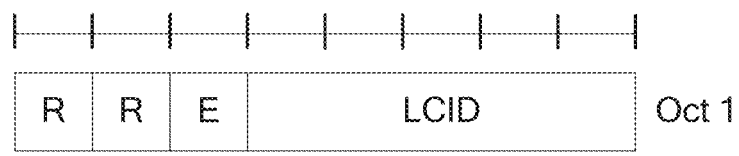
FIG. 7 is a reproduction of FIG. 6.1.2-2 of 3GPP TS36.321 v11.2.0.

A MAC PDU subheader consists of the six header fields R/R/E/LCID/F/L but for the last subheader in the MAC PDU and for fixed sized MAC control elements. The last subheader in the MAC PDU and subheaders for fixed sized MAC control elements consist solely of the four header fields R/R/E/LCID. A MAC PDU subheader corresponding to padding consists of the four header fields R/R/E/LCID.
[FIG. 6.1.2-1 of 3GPP TS36.321 v11.2.0 has been reproduced as FIG. 6]
[FIG. 6.1.2-2 of 3GPP TS36.321 v11.2.0 has been reproduced as FIG. 7]

MAC PDU subheaders have the same order as the corresponding MAC SDUs, MAC control elements and padding.

MAC control elements are always placed before any MAC SDU.

Padding occurs at the end of the MAC PDU, except when single-byte or two-byte padding is required. Padding may have any value and the UE shall ignore it. When padding is performed at the end of the MAC PDU, zero or more padding bytes are allowed.

When single-byte or two-byte padding is required, one or two MAC PDU subheaders corresponding to padding are placed at the beginning of the MAC PDU before any other MAC PDU subheader.

Figure 8:
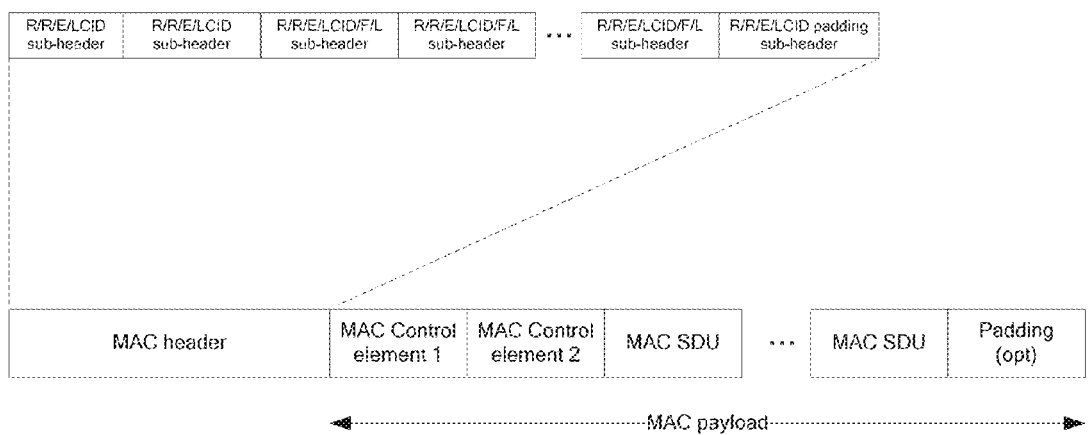
FIG. 8 is a reproduction of FIG. 6.1.2-3 of 3GPP TS36.321 v11.2.0.

A maximum of one MAC PDU can be transmitted per TB per UE. A maximum of one MCH MAC PDU can be transmitted per TTI.
[FIG. 6.1.2-3 of 3GPP TS36.321 v11.2.0 has been reproduced as FIG. 8]
6.1.3 MAC Control Elements
6.1.3.1 Buffer Status Report MAC Control Elements Buffer Status Report (BSR) MAC control elements consist of either:
  Short BSR and Truncated BSR format: one LCG ID field and one corresponding Buffer Size field (FIG. 6.1.3.1-1); or
  Long BSR format: four Buffer Size fields, corresponding to LCG IDs #0 through #3 (FIG. 6.1.3.1-2).

Figure 9:
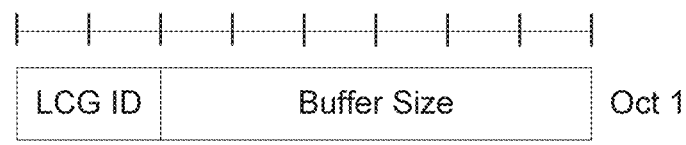
FIG. 9 is a reproduction of FIG. 6.1.3.1-1 of 3GPP TS36.321 v11.2.0.

The BSR formats are identified by MAC PDU subheaders with LCIDs as specified in table 6.2.1-2. The fields LCG ID and Buffer Size are defined as follow:
  LCG ID: The Logical Channel Group ID field identifies the group of logical channel(s) which buffer status is being reported. The length of the field is 2 bits;
  Buffer Size: The Buffer Size field identifies the total amount of data available across all logical channels of a logical channel group after all MAC PDUs for the TTI have been built. The amount of data is indicated in number of bytes. It shall include all data that is available for transmission in the RLC layer and in the PDCP layer; the definition of what data shall be considered as available for transmission is specified in [3] and [4] respectively. The size of the RLC and MAC headers are not considered in the buffer size computation. The length of this field is 6 bits. If extendedBSR-Sizes is not configured, the values taken by the Buffer Size field are shown in Table 6.1.3.1-1. If extendedBSR-Sizes is configured, the values taken by the Buffer Size field are shown in Table 6.1.3.1-2.
[FIG. 6.1.3.1-1 of 3GPP TS36.321 v11.2.0 has been reproduced as FIG. 9]

Figure 10:
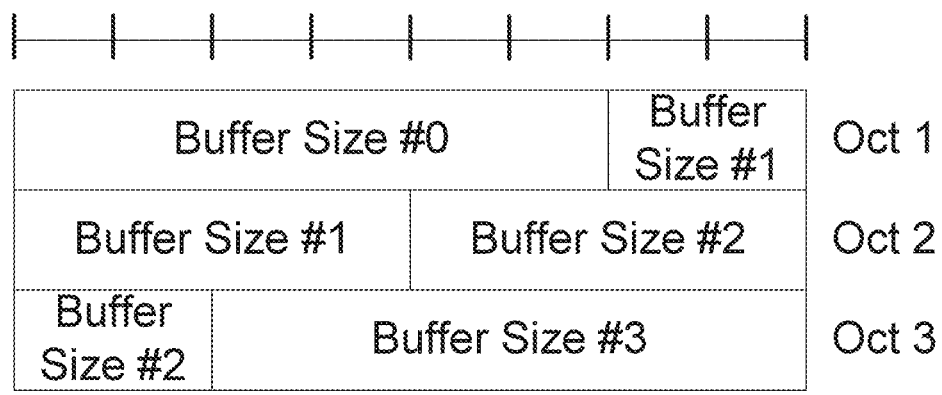
FIG. 10 is a reproduction of FIG. 6.1.3.1-2 of 3GPP TS36.321 v11.2.0.

[FIG. 6.1.3.1-2 of 3GPP TS36.321 v11.2.0 has been reproduced as FIG. 10]

TABLE 6.1.3.1-1

Buffer size levels for BSR

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| ... | ... |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| ... | ... |
| 63 | BS > 150000 |

TABLE 6.1.3.1-2

Extended Buffer size levels for BSR

| Index | Buffer Size (BS) value [bytes] |
|---|---|
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |
| ... | ... |
| 31 | 4017 < BS <= 4940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| ... | ... |
| 63 | BS > 3000000 |

[ . . . ]

6.2.1 MAC Header for DL-SCH, UL-SCH and MCH

The MAC header is of variable size and consists of the following fields:

LCID: The Logical Channel ID field identifies the logical channel instance of the corresponding MAC SDU or the type of the corresponding MAC control element or padding as described in tables 6.2.1-1, 6.2.1-2 and 6.2.1-4 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. The LCID field size is 5 bits;

L: The Length field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field;

F: The Format field indicates the size of the Length field as indicated in table 6.2.1-3. There is one F field per MAC PDU subheader except for the last subheader and subheaders corresponding to fixed-sized MAC control elements. The size of the F field is 1 bit. If the size of the MAC SDU or variable-sized MAC control element is less than 128 bytes, the value of the F field is set to 0, otherwise it is set to 1;

E: The Extension field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte;

R: Reserved bit, set to "0".

The MAC header and subheaders are octet aligned.

TABLE 6.2.1-2

Values of LCID for UL-SCH

| Index | LCID values |
|---|---|
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

3GPP R1-143590 includes the following agreements:

Agreement:
  PUSCH like hopping is used for D2D Data
  Both Type 1 PUSCH hopping and Type 2 PUSCH hopping are supported for D2D data
    Type 2 PUSCH hopping for D2D data uses a hopping ID that is configured with the SA resource pool configuration
  For Mode 2 data, the hopping only applies to the resources configured in the resource pool Agreement:
  The following working assumptions on T-RPT are confirmed:
  T-RPT in the SA indicates:
    Transmission interval(s) between transmission of multiple MAC PDUs
    Resources for transmission of each MAC PDU Agreement:
  The only possible value of the number of transmissions of a given D2D communication MAC PDU is 4.
  Each transmission takes place in one subframe.
  FFS whether any special behaviour is needed for TDD configurations that do not support 4 transmissions.

Proposed Working Assumption:
  The T-RPT in SA comprises an index to a pattern
  The pattern associated with each index is preconfigured, and may be reconfigured by RRC, using a bitmap
    Aim to restrict the number of valid patterns to 256
      Thomas to make a proposal on which 256 patterns are valid after agreement on the valid length(s) of the bitmap—R1-143450
    Length of the bitmap corresponds to the number of D2D subframes in a repetition cycle of the resource pool
      FFS on what lengths and how many lengths are supported Starting from the beginning of the bitmap, the first four 1's correspond to the first MAC PDU, the next four 1's correspond to the next MAC PDU, etc
Note that the 1's do not have to be contiguous
For mode 1, the subframes referenced by the pattern are contiguous D2D subframes
FFS whether the pattern can repeat; if so, the number of repetitions would be signalled in SA Companies are encouraged to check the details of this proposal and work together to refine it. Stefano to make a proposal on the length(s) of the bitmap for configuring the T-RPT indices—R1-143452 (merged into 3450).

Check the status on Wednesday afternoon after coffee break.

Companies are encouraged to check 3450 carefully and provide feedback to Thomas, aiming to reach agreement by Thur.

Revisit on Thursday afternoon—R1-143456.

Agreement:
As per R1-143456, with:
Addition of patterns with k=1
For mode 2, patterns with k=N are not supported Agreement:
Mode 1 D2D timing is always the same as the WAN PUSCH timing Agreement:
The TA value signaled via SA is the value closest to $N_{TA}$ not more than 4 ms before the start of the first transmission of the SA message.

Agreements:
The L1 SA design is a single design for unicast/groupcast/broadcast
The ID is signalled explicitly in the payload
Directly using the ID provided by RAN2
Number of bits: 8

Agreements:
Frequency resource is indicated by Rel-8 UL Type 0 resource allocation (5-13 bits depending on System BW)
1 bit frequency hopping indicator (as per Rel-8)
Note that some reinterpretation of the indexing is to be defined so that hopping does not use PRBs outside the configured resource pool for mode 2.
Note that only single-cluster resource allocations are valid
this implies that if there are gaps in the resource pool in the frequency domain, a resource allocation shall not straddle a gap
No RV indicator in SA
RV pattern for data: {0, 2, 3, 1}
Already agreed:
MCS (5 bits)
T-RPT (7 bits)
TA (6 bits)
ID (8 bits)

Agreement:
No other fields in SA (unless resource reservation announcement is agreed)

Agreements:
Number of transmissions: Always 2
Both transmissions use RV0

Proposal:
SA hopping is defined by
Time: second_nt=mod(first_nf+first_nt, Nt)+Nt
Frequency: second_nf=mod(first_nf+ceil(Nf/2), Nf)
Where
first_nt refers to time index of the first transmission within SA period: first_nt is between 0 and Nt−1
first_nf refers to frequency index of the first transmission within SA period
second_nt refers to time index of the second transmission within SA period: second_nt is between Nt and 2*Nt−1
second_nf refers to frequency index of the second transmission within SA period
Nt refers to the total number SA resources in time divided by 2 within a SA period
Number of SA sub-frames within a SA period is proposed to be an even value
Nf refers to the total number SA resources in frequency
Hopping is defined with respect to an SA receiver resource pool Agreement Including the Marked Changes:
Resource size for SA is 1 PRB pair
In a given subframe, the maximum supported size of the combined SA resource pools (i.e. the sum of the mode 1 and mode 2 SA resource pools) is 50
No search space is defined within the SA resource pool.

Agreement:
A discovery resource consists of 2 contiguous PRB in frequency
This is applicable to both normal and extended CP Agreement:
For Mode-2 communication and associated SA:
For transmission in a given scheduling period (i.e. including SA and data transmission), the UE selects a resource with equal probability from the available resources for the first transmission of SA,
Alt 0: No further details of the selection algorithm are specified in RAN1 specs
FFS:1 bit resource reservation announcement is included in SA to indicate that the resource is reserved in the next scheduling period, and the above selection avoids resources for which the UE has received a reservation announcement relating to this scheduling period.
Proponents to provide full details of 1-bit resource reservation by 6:59 pm—R1-143446.
Revisit on Wed.

Proposal:
In the current scheduling period, 1 bit resource reservation announcement is included in SA to indicate that the resource is reserved in the next scheduling period
Scheduling period is N SA periods (with N>=2)
UE will not transmit in the next scheduling period on resources for which reservations by other UEs are detected on the other N−1 SA periods during at least the current scheduling period
Observation: The above selection avoids resources for which the UE has received a reservation announcement relating to this scheduling period
No consensus.

Agreements:
For mode 2:
The data T-RPT cannot be uniquely identified from knowledge of the corresponding SA resource
i.e. the transmitting UE may select T-RPT for data independently from the SA resource selection, with equal probability out of the available and relevant T-RPTs, or
Note that the transmission interval between transmission of multiple MAC PDUs and the number of transmissions of a given MAC PDU are not part of the T-RPT selection process.

Agreement:
  For Mode 2:
    The transmitting UE may select the data frequency resource with equal probability out of the frequency resources that can be signalled by the SA
    Note that the size of the frequency resource for the data transmission is not part of the above equal-probability selection process.
Agreement:
  Transmission and reception resource pool for SA, Discovery, and Mode 2 data of a cell is indicated using subframeBitmap:
    1 indicates subframe with D2D resources
    0 indicates subframe with no D2D resources
  offsetIndicatorinitialization: Offset indicator used to determine the start of a resource pool
    The indicator is from SFN 0 of FFS between
      Serving cell or neighboring cells
        Only serving cell
    Granularity of 1 sub-frame
    RAN2 can choose to signal this parameter using 2 offsets
      The granularity of one of the two offsets does not need to be 1 subframe
  prbLength: length of a D2D allocation in PRB
    Does not represent the total D2D allocation in a sub-frame
  startPRB: D2D transmissions on a subframe can occur on PRB index greater than or equal to this value and less than startPRB+prbLength
  endPRB: D2D transmissions on a subframe can occur on the PRB index lesser than or equal to this value and greater than endPRB-prbLength
  Subframe bitmap details:
    For FDD, subframeBitmap refers to contiguous set of uplink subframes.
    For TDD, subframeBitmap refers to contiguous uplink sub-frames of a TDD configuration
      TDD configurations that the UEs are to assume for the neighboring cells are signalled
    FDD: subframe bitmap length is 40
    TDD (Working Assumption, to be checked until Friday):
      config 1-5: subframe bitmap length is twice the number of uplink sub-frames within a radio frame
      config 6: subframe bitmap length is 30
      config 0: subframe bitmap length is 42
    FFS whether any limitations are applied to the subframe bitmaps (e.g., limitations to the number of used subframes in the subframe bitmap)
    FFS in RAN2 the details on how the subframe bitmaps and pools are signaled
    FFS if the pre-configured pools are FDD or TDD, and how this is signaled, if needed
  Data Pool details as on slides 4, 5 and 6 in R1-143455, with the following changes:
    change of footnote on slide 6 to "*subframeBitmap is repeated numRepetition times within each discovery period".

| numRepetition | {1, ..., 5} for FDD, {1, ..., 8} for TDD config. 1 to 5, {1, ..., 4} for TDD config. 0, {1, ..., 5} for TDD config. 6 |

Values of numRepetition for TDD are a Working Assumption, to be checked until Friday
  On slides 2, 4, 5 and 6: offsetIndicator
    FFS how to interpret offsetIndicator, e.g. whether it directly indicates an offset or whether it is an input to a function to derive an offset.
  On slides 2, 4, 5, 6: change prbLength->numPRBs
  Stefano to provide update according to the above in R1-143570.
Agreement:
  From the UE perspective, at any given time instant, up to 4 discovery transmission pools can be independently configured, each of which may be configured for either of the discovery types
Agreement:
  From the UE perspective, at any given time instant, up to 4 mode 2 SA transmission pools can be available for selection at L1
  From the UE perspective, at any given time instant, up to 4 mode 2 data transmission pools can be available for selection at L1
  Note that there is a 1:1 association between an SA pool and a data pool, which is (pre-)configured for the receiver.
  The UE shall not expect to be (pre-)configured with SA pools which overlap.
Agreement:
  Padding: Size of D2D DCI is matched to size of DCI-0 that the UE is configured with by padding '0'
Agreement:
  D2D Grant does not contain an MCS field
  MCS can (depending on eNB implementation) be configured by eNB by RRC
    details of RRC signalling are up to RAN2
  If not currently configured by eNB, MCS selection is up to UE implementation
Agreement:

|  | 1.4 MHz | 20 MHz |
| --- | --- | --- |
| Hopping flag | 1 | 1 |
| Data RB allocation | 5 | 13 |
| T-RPT index | 7 | 7 |
| SA resource index | 6 | 6 |
| TPC | 1 | 1 |
| TOTAL: | 20 | 28 |
| Rel-8 Format 0 | 21 | 28 |

(with obvious interpolation to the other bandwidths)
  SA resource index is an index into the SA resource pool and indicates both time and frequency dimensions.
    FFS whether the mapping of the indices to the pool is fixed in the specification or configured by higher layer signalling
    Details FFS
  TPC bit switches between maximum available power and open-loop power control
  T-RPT index is 7 bits in both D2D Grant and SA for both Mode 1 and Mode 2
  Mode 1 grant refers to the next instance of SA resource pool that starts at least 4 ms after the subframe on which the Mode 1 grant is transmitted
  Revisit CIF after discussion on multicarrier operation.
  Candidates considered for removal:

2 T-RPT bits
  Sharp, LG, NEC
SA resource allocation
  Pana, Sharp,
MCS:
  All: HW, HiSi, QC, GDB, MS, ZTE, Samsung, E///
    Configured by higher layers or left to UE implementation
  Remove 2 bits: Fujitsu
  Remove 1 bit: Sharp
Agreement (Including Marked Changes):
  The hopping pattern for first transmission within a Type 2B discovery period is:
    Time: next_nt=mod(c*nf+nt*Nf+a, Nt)
    Frequency: next_nf=mod(floor((nf+nt*Nf)/Nt)+b, Nf)
  Here
    nt refers to logical time index of the first transmission within a discovery period
    of refers to logical frequency index of the first transmission within a discovery period
    Nt refers to the total number discovery resources in time divided by the number total transmissions within a discovery period
    Nf refers to the total number discovery resources in frequency
    c is RRC configured from a set of values that are positive and at least include 1
    a is cell specific and b' UE specific, and both are RRC configured
      Any means to identify which parameter value should be used at any given time instant are up to RAN2
    b=mod (b'+#discovery periods since b' was received, M), here
      b' indicates an index of the upcoming discovery period, when allocating a UE the Type 2B discover resource
      b is between 0 and M−1
      M is fixed in specification
        Working assumption to be checked until RAN1#78bis (including whether a single value of M is sufficient): M=10
  The hopping formula applies only to hopping across discovery periods
  At least joint time and frequency hopping is supported across discovery periods
    FFS whether only time hopping is used and can be configured
    FFS whether only frequency hopping is used and can be configured if retransmissions within a discovery period are configured
Agreement:
  In D2D WI in Rel-12, no change in 36.213 to PC for cellular UL transmissions compared to Rel-11
Agreements:
  For PD2DSS,
    Sequence:
      New root indices
        FFS: Detailed root indices
    Waveform:
      SC-FDM without DFT-precoding
    Number of symbols in a subframe is 2
  For SD2DSS,
    Sequence:
      Same sequence as Rel-8 SSS
    Waveform:
      SC-FDM without DFT-precoding with reduced power with respect to PD2DSS
      FFS: how to specify reduced power mechanism for SD2DSS
    Number of symbols in a subframe is 2
  For reception, in-coverage UEs may need D2DSS from another in-coverage UEs for time/freq. synchronization in some inter-cell scenarios
  Within a subframe, D2DSS symbol location is fixed for a given CP length
  For PD2DSCH,
    Only transmitted from synchronization source
    QPSK modulation
    TBCC
    16 bits CRC
    Message scrambling sequence is derived from PSSID
    Multiplexed in the same PRBs with D2DSS
      FFS: Symbols used only for D2DSS and PD2DSCH within a subframe Assuming that it is possible to have some remaining transmission opportunities in the current SA (Scheduling Assignment)/Data cycle after some D2D transmissions in this cycle, the UE may need to consider (if possible) how to use those opportunities or whether to send a Scheduling Assignment in the following SA period and then be able to send the D2D data and/or the ProSe BSR through the resources associated with the following SA period. The latency of transmitting the D2D data and transmission robustness between transmitter and receiver might need to be studied, especially for some services like urgent data or VoIP. Furthermore, whether or how to update the BSR content is also a potential problem since the D2D data and ProSe BSR are sent to different destinations, BSR cancellation in legacy LTE system might not work well.

When an SA is assigned to an UE or UE is already within a SA/Data cycle, UE may roughly or precisely derive or calculate the total amount or the remaining or unused grant which the UE can use in the current or the following SA/Data cycle for some specific purposes.

Figure 11:
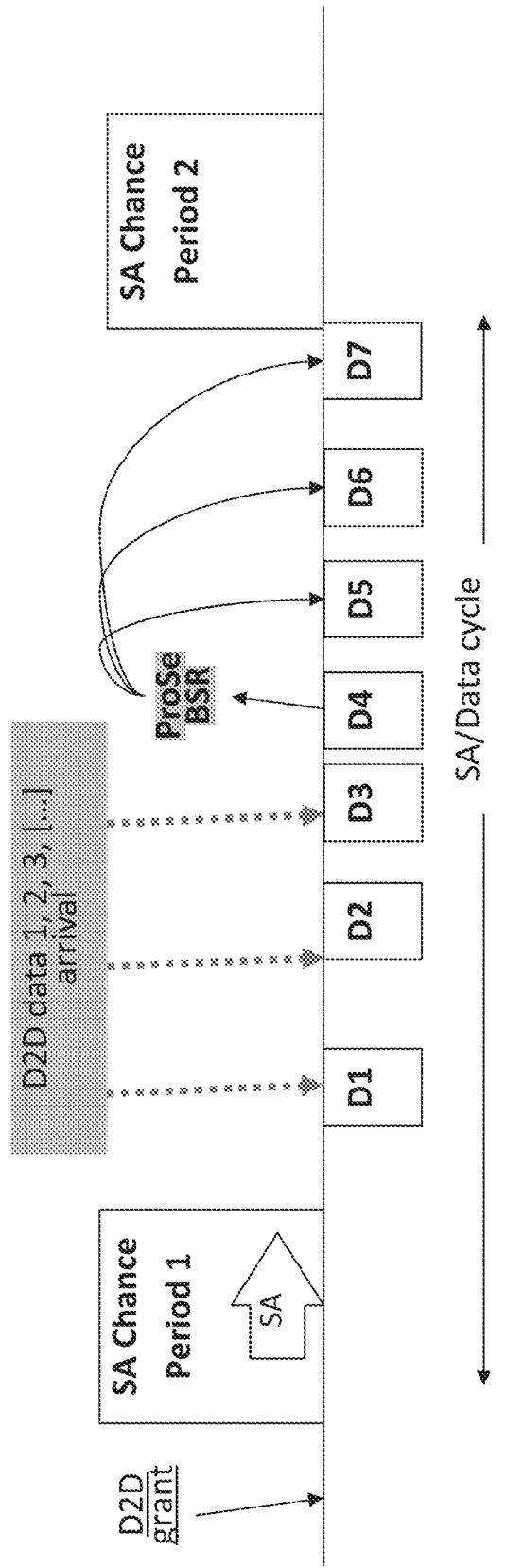
FIG. 11 is a timing diagram according to one exemplary embodiment.

The reported ProSe BSR content may consider or estimate the amount of the remaining grants in the SA/Data cycle. For example, if 10 units of new data are coming and 3 units D2D grant remains in the current SA/Data cycle, the UE may report a BSR content less than 10 units, such as 7 unites if simply doing subtraction. The BSR may not be even triggered or will be cancelled if the remaining grant in the SA/data cycle is sufficient. Alternatively, it is also possible to send a BSR with buffer size equal to 0. For example, as illustrated in FIG. 11, D2D data arrives at the UE side to trigger a ProSe BSR sent to the base station and the reported buffer status information should also consider the D5, D6 and D7 SA/Data cycles.

Figure 12:
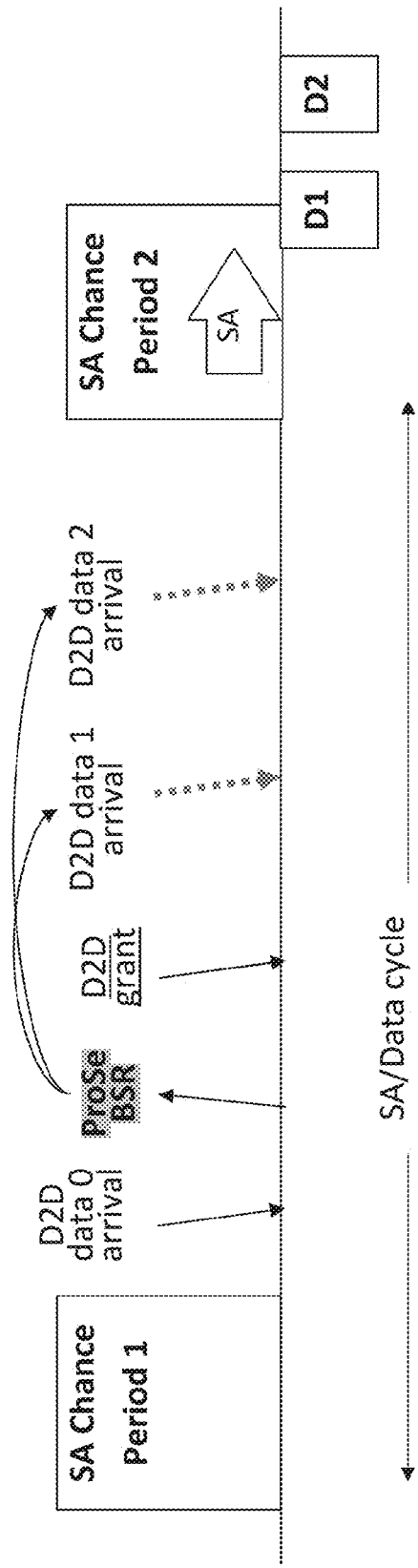
FIG. 12 is a timing diagram according to one exemplary embodiment.

Furthermore, the reported ProSe BSR content may consider or estimate the amount of the oncoming data in the SA/Data cycle. The estimation may be based on the service type configured by network. For example, if the amount of data currently stored in the buffer is 3 units and the UE predicts that there will be 10 units of data coming (in the following SA/Data cycle), the UE may report a BSR content more than the amount of data currently stored in the buffer, such as 13 units if simply doing addition. For example, as illustrated in FIG. 12, D2D data 0 arrives at the UE side to trigger a ProSe BSR sent to the base station and the reported buffer status information should consider the potential oncoming D2D data 1 and 2.

Figure 13:
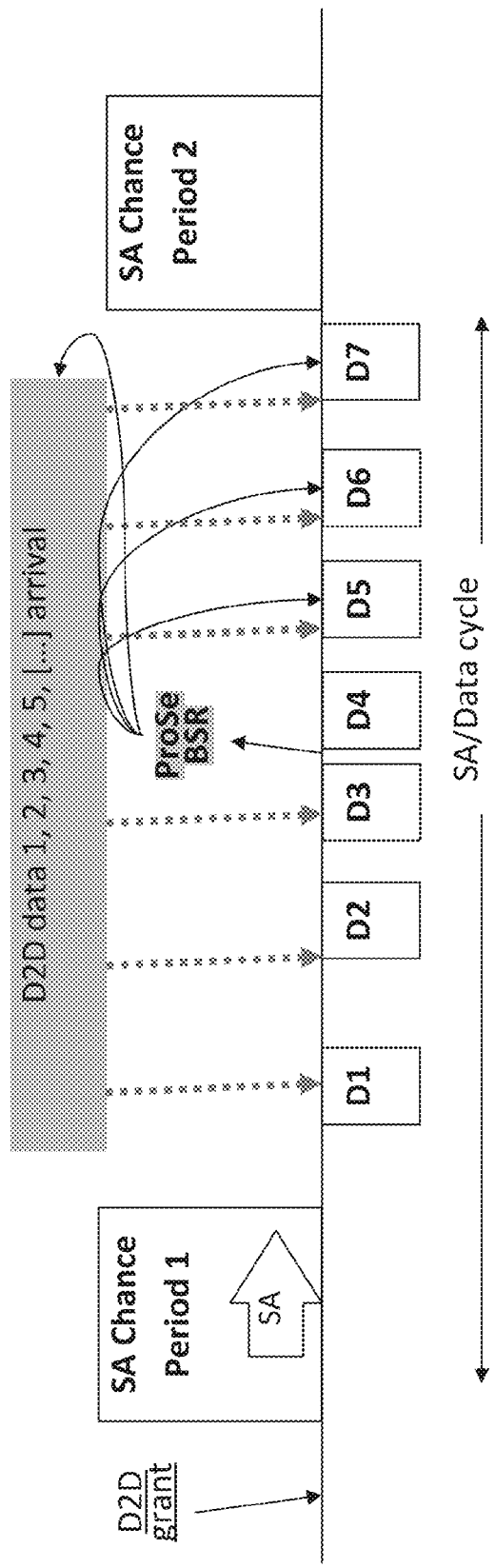
FIG. 13 is a timing diagram according to one exemplary embodiment.

The aforementioned two methods of BSR content estimation (i.e., "remaining grants" and "oncoming data") could also be considered together. For example, the UE may estimate and report a BSR content by doing both subtraction and addition to have a better estimation. One example is illustrated in FIG. 13.

Since D2D data arrival could also happen in the next SA/Data cycle, the reported ProSe BSR might also consider such data arrival. FIGS. 11, 12, and 13 just show the oncoming data in one SA/Data cycle. However, the oncoming data could actually occur in the next or subsequent cycle. Furthermore, ProSe BSR or the information of amount of D2D data could be sent by a device to the network or the other device since it might be beneficial for the other device to know how much data will roughly be transmitted in advanced.

Figure 14:
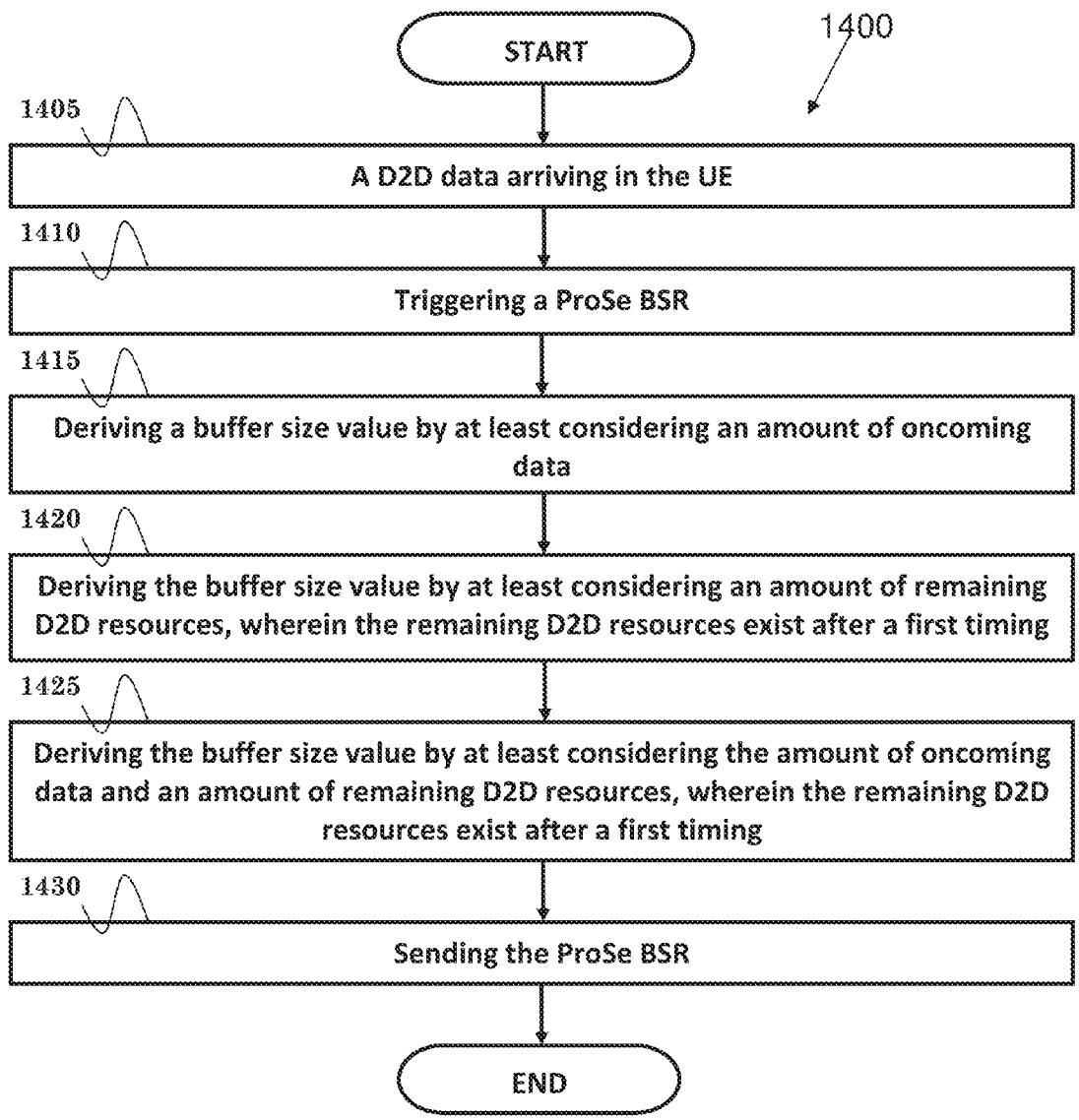
FIG. 14 is a flow chart according to one exemplary embodiment.

FIG. 14 is a flow chart 1400 in accordance with one exemplary embodiment from the perspective of a UE. In step 1405, a D2D data arrives in the UE. In step 1410, triggering a ProSe BSR. In step 1415, a buffer size value could be derived by at least considering an amount of oncoming data. In one embodiment as shown in step 1420, the buffer size value could be derived by at least considering an amount of remaining D2D resources, wherein the remaining D2D resources exist after a first timing. Alternatively, as shown in step 1425, the buffer size value could be derived by at least considering the amount of oncoming data and an amount of remaining D2D resources, wherein the remaining D2D resources exist after a first timing. In step 1430, the ProSe BSR is sent.

Referring back to FIGS. 3 and 4, the device 300 includes a program code 312 stored in memory 310 of a UE wherein a D2D data arriving in the UE. The CPU 308 could execute program code 312 to enable the UE (i) to trigger a ProSe BSR, (ii) to derive a buffer size value by at least considering an amount of the oncoming data, and (iii) to send the ProSe BSR.

In one embodiment, the processor could further execute the program code stored in the memory to derive the buffer size value by at least considering an amount of remaining D2D resources, wherein the remaining D2D resources exist after a first timing. Alternatively, the processor is could also execute the program code stored in the memory to derive the buffer size value by at least considering the amount of oncoming data and an amount of remaining D2D resources, wherein the remaining D2D resources exist after a first timing.

In addition, the CPU 308 could execute the program code 312 to perform all of the above-described actions and steps or others described herein.

However, if BSR content does not have a proper estimation as mentioned above then the base station may not be able to select a proper T-RPT (The (same) time resource pattern for transmission) for the UE. Currently, there are two types of cancellation. One type of cancellation is that the MAC PDU (Medium Access Control Packet Data Unit) can accommodate all pending data available for transmission but is not sufficient to additionally accommodate the BSR. The other type of cancellation is that the BSR is included in the MAC PDU. The first type of cancellation is not needed in the D2D case because there is no pending data for the base station.

Currently, there are three kind of triggers, including Regular BSR (for "data arrival in empty buffer", "higher priority data arrival", and "BSR retransmission timer expiry"), Periodic BSR, and Padding BSR. Since the UL grant is only used to carry ProSe BSR rather than D2D data, Periodic BSR and Padding BSR might not be usedful in this case. Thus the update of ProSe BSR can only rely on "data arrival in empty buffer", "higher priority data arrival", and "BSR retransmission timer expiry". However, the first two causes ("data arrival in empty buffer" and "higher priority data arrival") are based on traffic pattern and for LTE release 12. Furthermore, the cause of "higher priority data arrival" is not useful due to all D2D logical channels belonging to the same logical channel group. And the last cause ("BSR retransmission timer expiry") is mainly used for error handling (note: the minimum value of timer is 320 ms) so all three causes do not seem be good options to use to update the ProSe BSR content. In addition to the issue just mentioned, since the UE might be involved in more than one group sessions, how to used one ProSe BSR for requesting D2D grant from the base station is also an problem.

The UE could delay sending ProSe BSR so as to reflect the up-to-date buffer status information. In other words, UE may just send a ProSe BSR at timing close to the next SA period, which can be implemented through a fixed or predefined period, a configuration from the base station or determined by UE itself. Following this concept, ProSe BSR 1 in FIG. 14 may not be sent even if D2D data 0 has arrived, and ProSe BSR 2 may be sent since it is already close to SA Chance Period 2. Although other D2D data may arrive later than transmission of ProSe BSR, it makes no big difference from the base station viewpoint if the amount is not large. Hence, the UE can send or trigger another ProSe BSR if the amount of all pending data available for transmission is over a threshold compared with the reported BSR. This threshold can be configured by the base station or derived by the UE.

Figure 15:
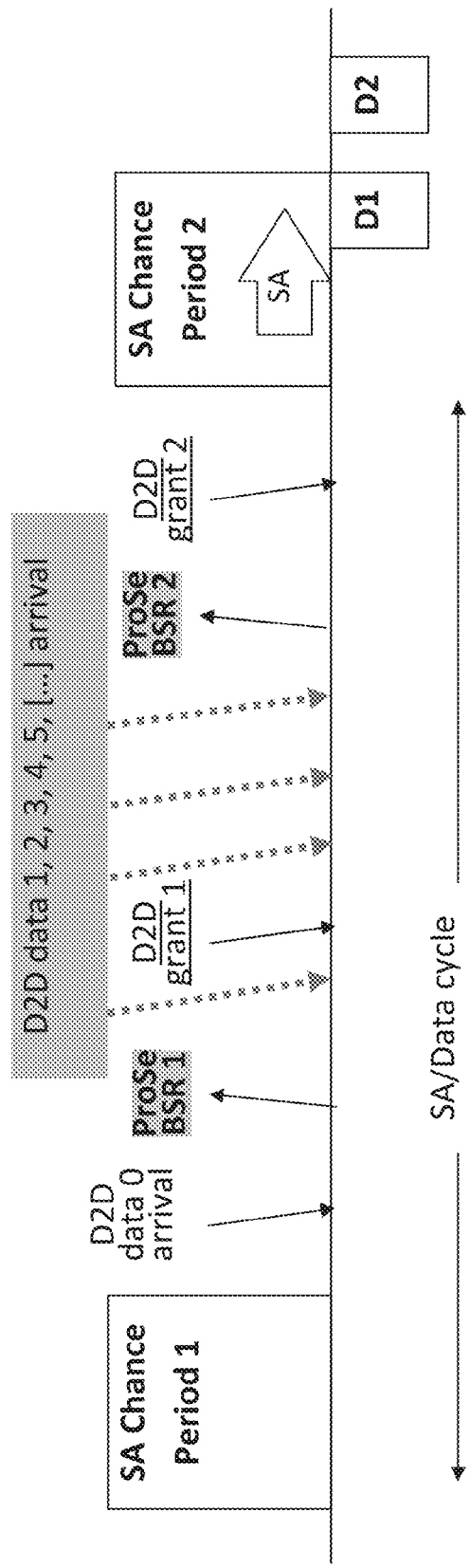
FIG. 15 is a timing diagram according to one exemplary embodiment.
Figure 16:
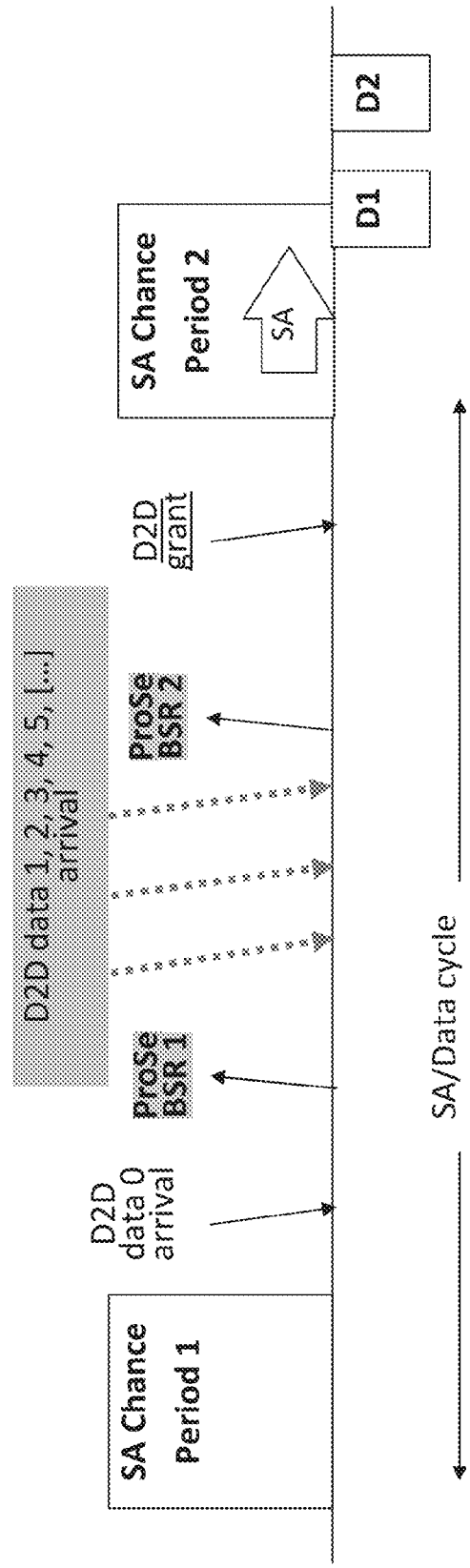
FIG. 16 is a timing diagram according to one exemplary embodiment.

FIG. 15 and FIG. 16 illustrate two exemplary cases. In FIG. 15, D2D grant 1 has been received upon sending ProSe BSR 1, and there are still many D2D data arriving after receiving D2D grant 1. ProSe BSR 2 may be sent based on whether the D2D grant 1 can handle all or almost all pending data, and D2D grant 2 may be received. In FIG. 16, upon sending ProSe BSR 1, if other D2D data arrive, ProSe BSR 2 may be sent and D2D grant may be received.

Figure 17:
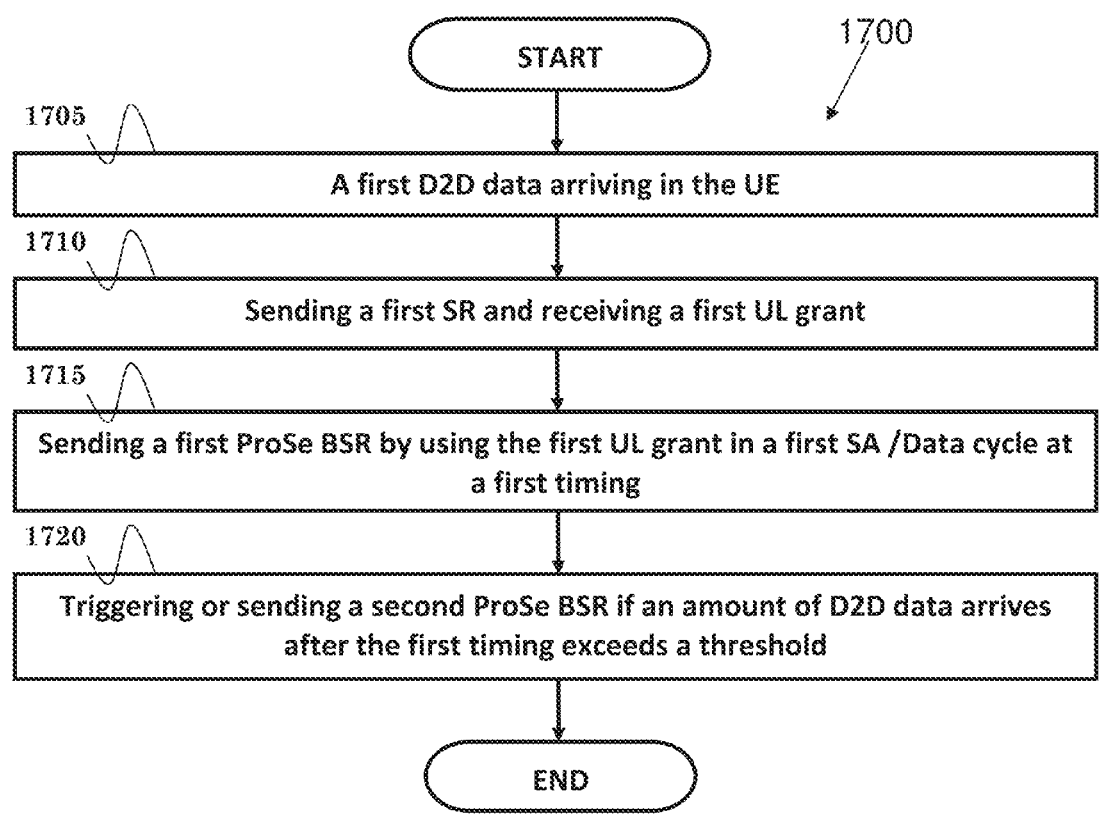
FIG. 17 is a flow chart according to one exemplary embodiment.

FIG. 17 is a flow chart 1700 in accordance with one exemplary embodiment from the perspective of a UE. In step 1705, a first D2D data arrives in the UE. In step 1710, a first SR is sent, and a first UL grant is received. In step 1715, a first ProSe BSR is sent by using the first UL grant in a first SA/Data cycle at a first timing. In step 1720, a second ProSe BSR is triggered or sent if an amount of D2D data arrives after the first timing exceeds a threshold.

Referring back to FIGS. 3 and 4, the device 300 includes a program code 312 stored in memory 310 of a UE, wherein a first D2D data arriving in the UE. In one embodiment, the CPU 308 could execute program code 312 to enable the UE (i) to send a first SR and receive a first UL grant, (ii) to send a first ProSe BSR by using the first UL grant in a first SA/Data cycle at a first timing, and (iii) to trigger or send a second ProSe BSR if an amount of D2D data arrives after the first timing exceeds a threshold.

In addition, the CPU 308 could execute the program code 312 to perform all of the above-described actions and steps or others described herein.

Figure 18:
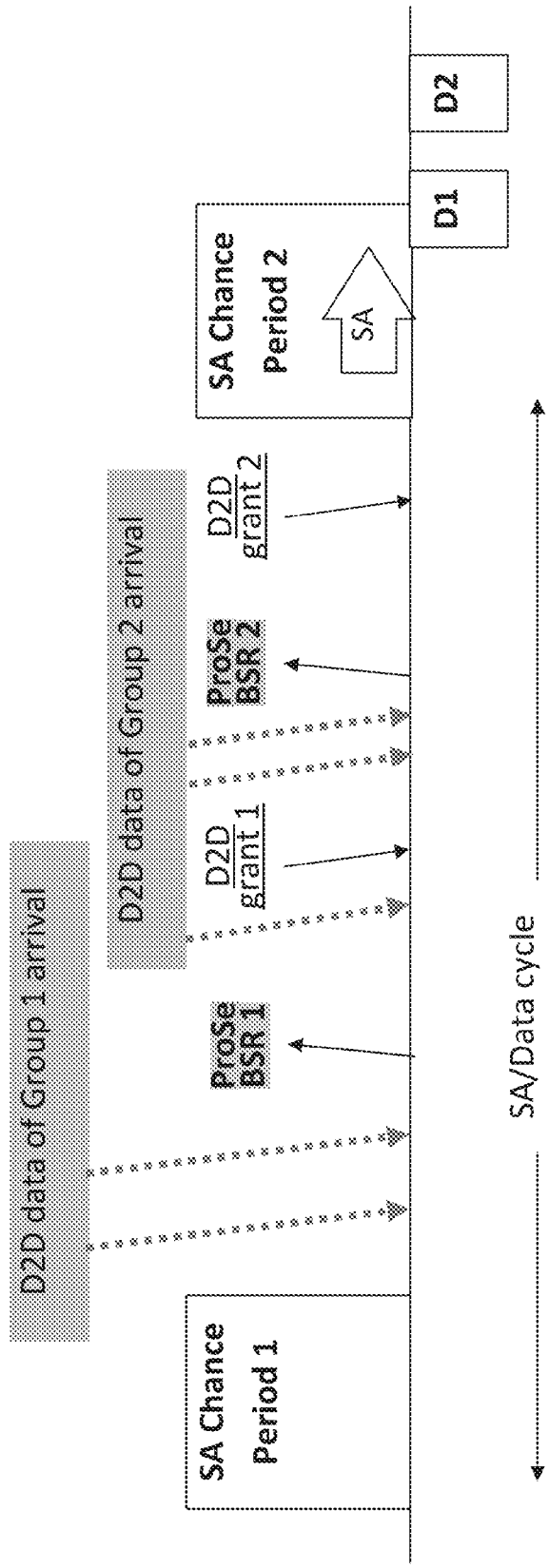
FIG. 18 is a timing diagram according to one exemplary embodiment.

As illustrated in FIG. 18, ProSe BSR 1 is triggered or sent by a UE if D2D data of Group 1 arrives in UE side. Later, the eNB sends D2D grant 1 to the UE. However, D2D data of Group 2 also arrive in the same SA/Data cycle, and the UE needs to trigger or send ProSe BSR 2. If there is a condition check for triggering ProSe BSR 2, it may be based on whether Group 2 has higher priority than Group 1, and the priority is configured by the base station or is determined by the UE itself. The UE may receive a D2D grant 2, and the UE should ignore, discard, or overwrite the previously received D2D grant 1. Considering LTE BSR operation as the baseline, the "data of other group session arrival" could be a BSR or Regular BSR trigger. The "data of other group session arrival" generally means that there is already data pending in one group session and the data of another group session arrives while no pending data exist in another group session.

Figure 19:
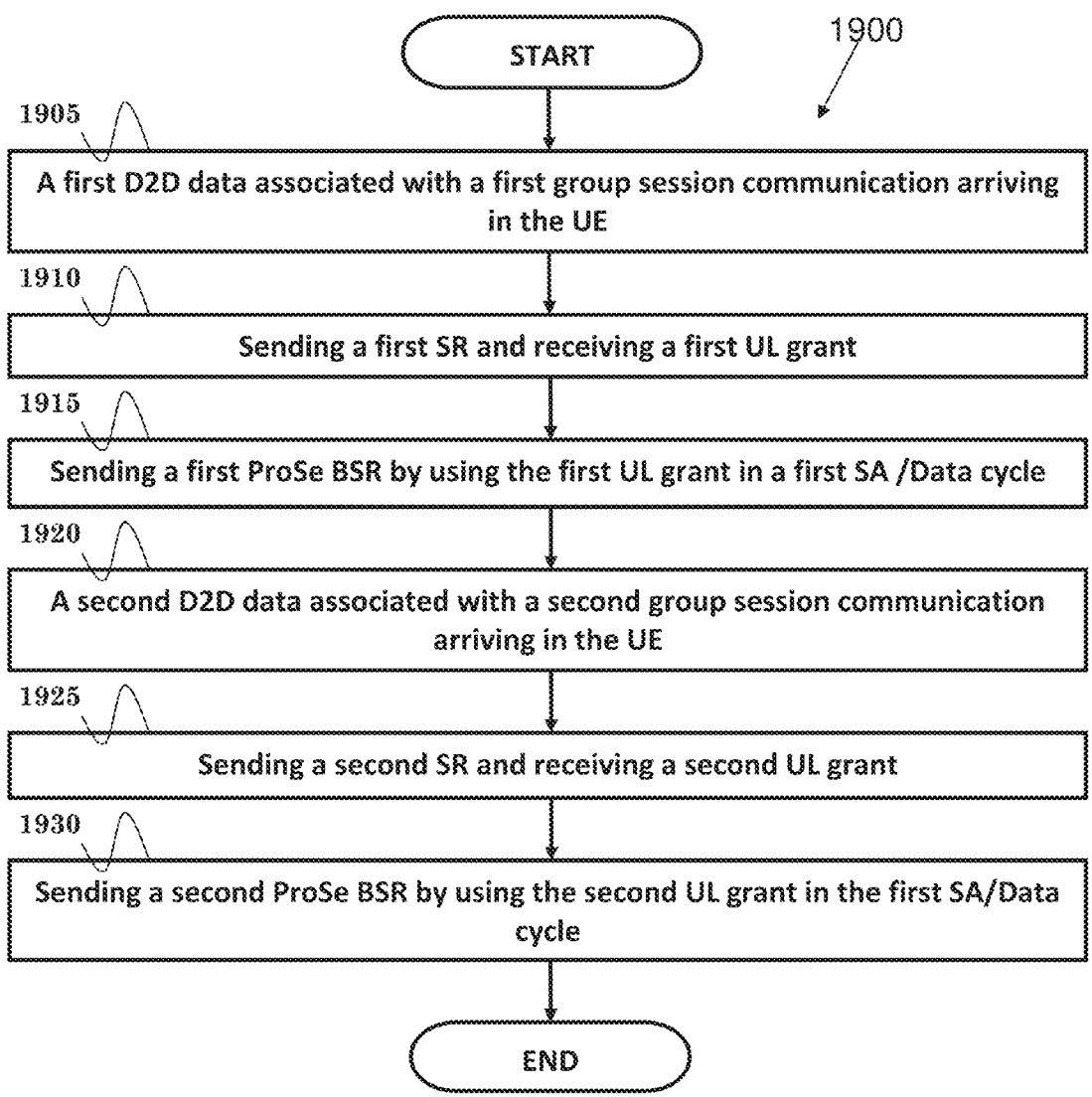
FIG. 19 is a flow chart according to one exemplary embodiment.

FIG. 19 is a flow chart 1900 in accordance with one exemplary embodiment from the perspective of a UE. In step 1905, a first D2D data associated with a first group session communication arriving in the UE. In step 1910, a first SR is sent, and a first UL grant is received. In step 1915, a first ProSe BSR is sent by using the first UL grant in a first SA/Data cycle. In step 1920, a second D2D data associated with a second group session communication arriving in the UE. In step 1925, a second SR is sent, and a second UL grant is received. In step 1930, a second ProSe BSR is sent by using the second UL grant in the first SA/Data cycle.

Referring back to FIGS. 3 and 4, the device 300 includes a program code 312 stored in memory 310 of a UE, wherein a first D2D data associated with a first group session communication and a second D2D data associated with a second group session communication arriving in the UE. In one embodiment, the CPU 308 could execute program code 312 to enable the UE (i) to send a first SR and to receive a first UL grant, (ii) to send a first ProSe BSR by using the first UL grant in a first SA/Data cycle, (iii) to send a second SR and receive a second UL grant, and (iv) to send a second ProSe BSR by using the second UL grant in the first SA/Data cycle.

In addition, the CPU 308 could execute the program code 312 to perform all of the above-described actions and steps or others described herein.

Figure 20:
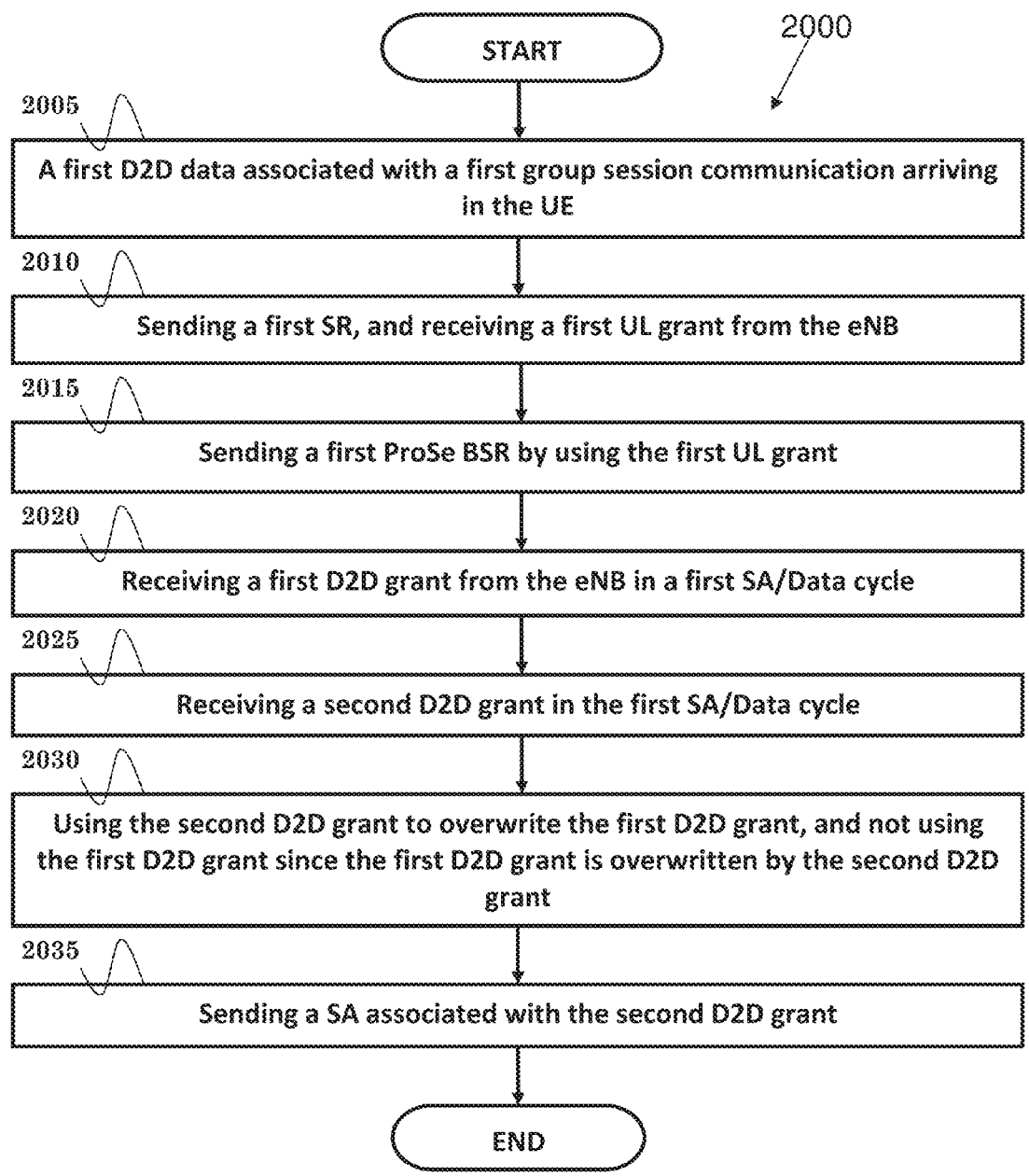
FIG. 20 is a flow chart according to one exemplary embodiment.

FIG. 20 is a flow chart 2000 in accordance with one exemplary embodiment from the perspective of a UE. In step 2005, a first D2D data associated with a first group session communication arriving in the UE. In step 2010, the UE sends a first SR is sent and a first UL grant is received from the eNB. In step 2015, the UE sends a first ProSe BSR by using the first UL grant. In step 2020, the UE receives a first D2D grant is received from the eNB in a first SA/Data cycle. In step 2025, a second D2D grant is received in the first SA/Data cycle. In step 2030, the second D2D grant is used to overwrite the first D2D grant. Furthermore, the first D2D grant is not used since it is overwritten by the second D2D grant. In step 2035, the UE sends a SA associated with the second D2D grant.

Referring back to FIGS. 3 and 4, the device 300 includes a program code 312 stored in memory 310 of a UE, wherein a first D2D data associated with a first group session communication arriving in the UE. In one embodiment, the CPU 308 could execute program code 312 to enable the UE (i) to send a first SR and receive a first UL grant from the eNB, (ii) to send a first ProSe BSR by using the first UL grant, (iii) to receive a first D2D grant in a first SA/Data cycle, (iv) to receive a second D2D grant in the first SA/Data cycle, (v) to use the second D2D grant to overwrite the first D2D grant, and not use the first D2D grant since the first D2D grant is overwritten by the second D2D grant, and (vi) to send a SA associated with the second D2D grant.

In addition, the CPU 308 could execute the program code 312 to perform all of the above-described actions and steps or others described herein.

Figure 21A:
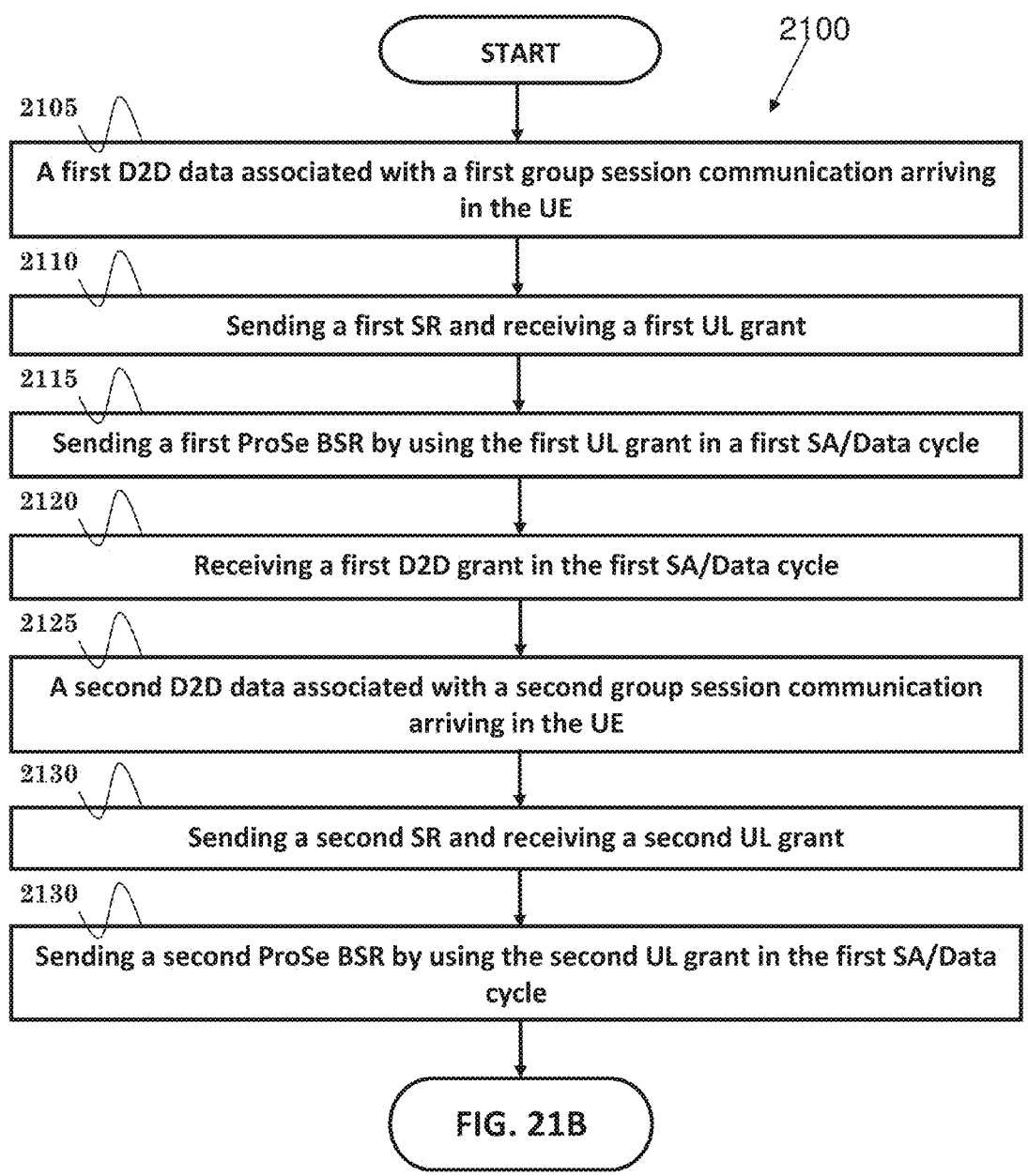
FIG. 21A and FIG. 21B are flow charts according to one exemplary embodiment.

FIG. 21A is a flow chart 2100 in accordance with one exemplary embodiment from the perspective of a UE. In step 2105, a first D2D data associated with a first group session communication arriving in the UE. In step 2110, a first SR is sent, and a first UL grant is received. In step 2115, a first ProSe BSR is sent by using the first UL grant in a first SA/Data cycle. In step 2120, a first D2D grant is received in the first SA/Data cycle. In step 2125, a second D2D data associated with a second group session communication arriving in the UE. In step 2130, a second SR is sent, and a second UL grant is received. In step 2135, a second ProSe BSR is sent by using the second UL grant in the first SA/Data cycle.

Figure 21B:
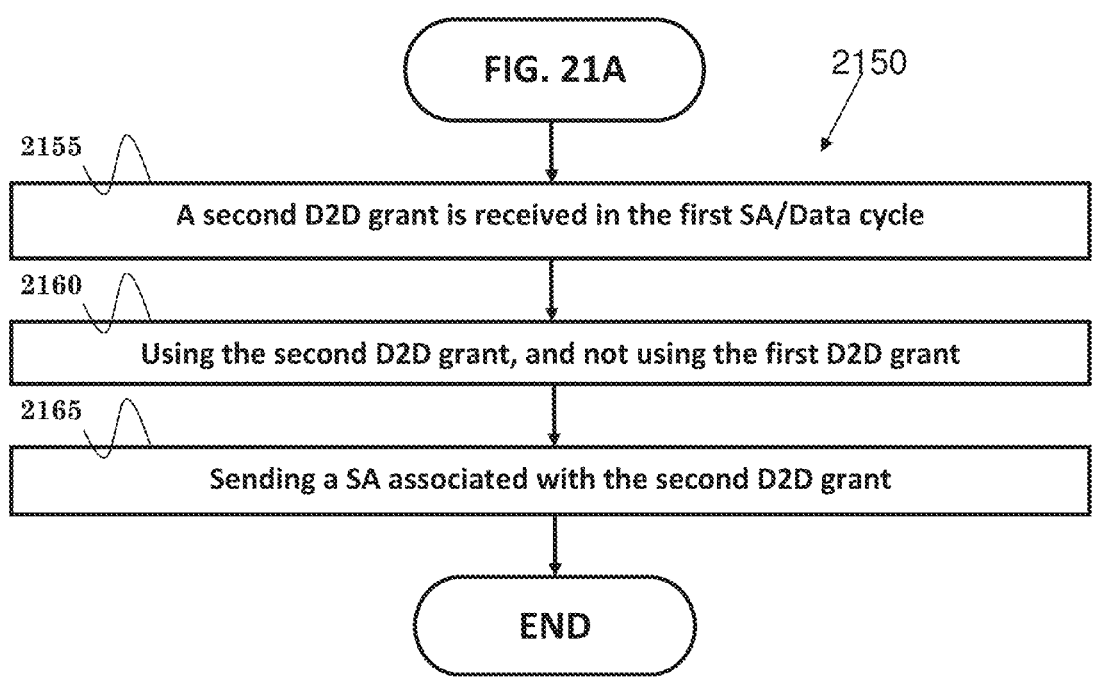

FIG. 21B is a flow chart 2150 in accordance with one exemplary embodiment from the perspective of a UE. FIG. 21B is generally an extension of FIG. 21A. As shown in step 2155 of FIG. 21B, the UE receives a second D2D grant in the first SA/Data cycle. In step 2160, the UE uses the second D2D grant, and does not use the first D2D grant. In step 2165, the UE sends a SA associated with the second D2D grant.

Referring back to FIGS. 3 and 4, the device 300 includes a program code 312 stored in memory 310 of a UE, wherein a first D2D data associated with a first group session communication and a second D2D data associated with a second group session communication arriving in the UE. In one embodiment, the CPU 308 could execute program code 312 to enable the UE (i) to send a first SR and to receive a first UL grant, (ii) to send a first ProSe BSR by using the first UL grant in a first SA/Data cycle, (iv) to receive a first D2D grant in the first SA/Data cycle, (iv) to send a second SR and receive a second UL grant, and (v) to send a second ProSe BSR by using the second UL grant in the first SA/Data cycle.

In one embodiment, the CPU 308 could further execute the program code 312 to enable the UE (i) to receive a second D2D grant in the first SA/Data cycle, (ii) to use the second D2D grant and not use the first D2D grant, and (iii) to send a SA associated with the second D2D grant.

In addition, the CPU 308 could execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment) in a wireless communication system, wherein the UE and a plurality of other UEs form a connected group of UEs, and the UE is able to send D2D (Device-to-Device) data to the connected group of UEs in group session communications through D2D grant(s) allocated from an eNB (evolved Node B), the method comprising:
   a first D2D data associated with a first group session communication arriving in the UE from a higher layer;
   sending a first SR (Scheduling Request) to the eNB, and receiving a first UL (Uplink) grant from the eNB;
   sending a first ProSe (Proximity-based Service) BSR (Buffer Status Report) to the eNB by using the first UL grant in a first SA (Scheduling Assignment)/Data cycle;
   a second D2D data associated with a second group session communication arriving in the UE from the higher layer;
   sending a second SR to the eNB, and receiving a second UL grant from the eNB; and
   sending a second ProSe BSR to the eNB by using the second UL grant in the first SA/Data cycle.

2. The method of claim 1 further comprises:
   receiving a first D2D grant from the eNB in the first SA/Data cycle.

3. The method of claim 2 further comprises:
   receiving a second D2D grant from the eNB in the first SA/Data cycle;
   using the second D2D grant and not using the first D2D grant; and
   sending a SA associated with the second D2D grant to the plurality of other UEs.

4. A method of a UE (User Equipment) for performing buffer status reporting in a wireless communication system, wherein the UE and a plurality of other UEs form a connected group of UEs, and the UE is able to send D2D (Device-to-Device) data to multiple UEs in the connected group of UEs in group session communications through D2D grant(s) allocated from an eNB (evolved Node B), the method comprising:
   a first D2D data associated with a first group session communication arriving in the UE from a higher layer;
   sending a first SR (Scheduling Request) to the eNB, and receiving a first UL (Uplink) grant from the eNB;
   sending a first ProSe (Proximity-based Service) BSR (Buffer Status Report) to the eNB by using the first UL grant;
   receiving a first D2D grant from the eNB in a first SA (Scheduling Assignment)/Data cycle;
   receiving a second D2D grant from the eNB in the first SA/Data cycle;

using the second D2D grant to overwrite the first D2D grant, and not using the first D2D grant since the first D2D grant is overwritten by the second D2D grant; and
sending a SA associated with the second D2D grant to the plurality of other UEs.

5. A UE (User Equipment) in a wireless communication system, wherein the UE and a plurality of other UEs form a connected group of UEs, and the UE is able to send D2D (Device-to-Device) data to the connected group of UEs in group session communications through D2D grant(s) allocated from an eNB (evolved Node B), the UE comprising:
 a control circuit;
 a processor installed in the control circuit; and
 a memory installed in the control circuit and operatively coupled to the processor;
 wherein the processor is configured to execute a program code stored in the memory to:
  receive, from a higher layer, a first D2D (Device-to-Device) data associated with a first group session communication;
  send a first SR (Scheduling Request) to the eNB, and receiving a first UL (Uplink) grant from the eNB;
  send a first ProSe (Proximity-based Service) BSR (Buffer Status Report) to the eNB by using the first UL grant in a first SA (Scheduling Assignment)/Data cycle;
  receive, from the higher layer, a second D2D data associated with a second group session communication;
  send a second SR to the eNB, and receive a second UL grant from the eNB; and
  send a second ProSe BSR to the eNB by using the second UL grant in the first SA/Data cycle.

6. The UE of claim 5, wherein the processor is further configured to execute a program code stored in the memory to:
 receive a first D2D grant from the eNB in the first SA/Data cycle.

7. The method of claim 6, wherein the processor is further configured to execute a program code stored in the memory to:
 receive a second D2D grant from the eNB in the first SA/Data cycle;
 use the second D2D grant and not using the first D2D grant; and
 send a SA associated with the second D2D grant to the plurality of other UEs.

8. A UE (User Equipment) for performing buffer status reporting in a wireless communication system, wherein the UE and a plurality of other UEs form a connected group of UEs, and the UE is able to send D2D (Device-to-Device) data to multiple UEs in the connected group of UEs in group session communications through D2D grant(s) allocated from an eNB (evolved Node B), the UE comprising:
 a control circuit;
 a processor installed in the control circuit; and
 a memory installed in the control circuit and operatively coupled to the processor;
 wherein the processor is configured to execute a program code stored in the memory to:
  receive, from a higher layer, a first D2D (Device-to-Device) data associated with a first group session communication;
  send a first SR (Scheduling Request) to the eNB, and receive a first UL (Uplink) grant from the eNB;
  send a first ProSe (Proximity-based Service) BSR (Buffer Status Report) to the eNB by using the first UL grant;
  receive, from the eNB, a first D2D grant in a first SA (Scheduling Assignment)/Data cycle;
  receive, from the eNB, a second D2D grant in the first SA/Data cycle;
  use the second D2D grant to overwrite the first D2D grant, and not using the first D2D grant since the first D2D grant is overwritten by the second D2D grant; and
  send, to the plurality of other UEs, a SA associated with the second D2D grant.

\* \* \* \* \*